(12) United States Patent
Han et al.

(10) Patent No.: US 11,393,078 B2
(45) Date of Patent: Jul. 19, 2022

(54) ELECTRONIC DEVICE AND METHOD FOR CORRECTING IMAGE ON BASIS OF IMAGE TRANSMISSION STATE

(71) Applicant: Samsung Electronics Co., Ltd., Suwon-si (KR)

(72) Inventors: Changsu Han, Suwon-si (KR); Youngjo Kim, Suwon-si (KR); Hyunhee Park, Suwon-si (KR); Hongseok Yang, Suwon-si (KR); Sungjun Lim, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/257,989

(22) PCT Filed: Jul. 19, 2019

(86) PCT No.: PCT/KR2019/008986
§ 371 (c)(1),
(2) Date: Jan. 5, 2021

(87) PCT Pub. No.: WO2020/017936
PCT Pub. Date: Jan. 23, 2020

(65) Prior Publication Data
US 2021/0272249 A1 Sep. 2, 2021

(30) Foreign Application Priority Data

Jul. 20, 2018 (KR) .................. 10-2018-0084989

(51) Int. Cl.
*G06T 5/00* (2006.01)
*H04B 17/373* (2015.01)
(Continued)

(52) U.S. Cl.
CPC .............. *G06T 5/005* (2013.01); *G06V 20/40* (2022.01); *H04B 17/373* (2015.01); *H04N 5/23222* (2013.01)

(58) Field of Classification Search
CPC ......... G06T 5/005; G06T 5/001; G06V 20/40; H04B 17/373; H04B 17/318;
(Continued)

(56) References Cited

U.S. PATENT DOCUMENTS 4,823,184 A * 4/1989 Belmares-Sarabia ....................... H04N 5/147
348/E9.037
10,070,175 B2 9/2018 Jang
(Continued)

FOREIGN PATENT DOCUMENTS

JP 2016-063251 A 4/2016
KR 10-2015-0083491 A 7/2015
(Continued)

*Primary Examiner* — Yogesh K Aggarwal
(74) *Attorney, Agent, or Firm* — Jefferson IP Law, LLP

(57) ABSTRACT

An electronic device comprises: a camera, at least one communication module; at least one memory; and at least one processor. The processor may be configured so as to: acquire a raw image of an external object by using the camera; generate a small raw image corresponding to the raw image; determine the possibility or not of the transmission of the small raw image from the electronic device to an external device by using at least some of the communication modules, among the at least one communication module; when the transmission of the small raw image is determined to be in a possible state, transmit the small raw image to the external device so that the external electronic device may generate first correction information by using the small raw image and on the basis of a correction processing method of the external device; receive the first correction information from the external device; when the transmission of the small
(Continued)

raw image is determined to be in an impossible state, determine situation information of the image; check second correction information which is generated on the basis of the situation information; and by using one corresponding correction information, among the first correction information and the second correction information, generate a corrected image generated by correcting the raw image.

15 Claims, 16 Drawing Sheets

(51) Int. Cl.
    *H04N 5/232*     (2006.01)
    *G06V 20/40*     (2022.01)
(58) Field of Classification Search
    CPC ........... H04B 17/3913; H04N 5/23222; H04N 5/217; H04N 5/23206; H04N 5/225; H04N 5/23229; H04N 5/2257
    USPC .......................................... 348/207.1, 207.99
See application file for complete search history.

(56) References Cited

U.S. PATENT DOCUMENTS

| | | |
|---|---|---|
| 2014/0126841 A1 | 5/2014 | Wang et al. |
| 2016/0219126 A1 | 7/2016 | Oh et al. |
| 2017/0053128 A1* | 2/2017 | Lee ..................... G06F 21/6245 |
| 2017/0264858 A1 | 9/2017 | Nozawa et al. |
| 2019/0110077 A1 | 4/2019 | Kim et al. |

FOREIGN PATENT DOCUMENTS

| | | |
|---|---|---|
| KR | 10-2015-0128482 A | 11/2015 |
| KR | 10-2016-0092136 A | 8/2016 |
| KR | 10-1795537 B1 | 12/2017 |
| KR | 10-2019-0040416 A | 4/2019 |

* cited by examiner

ELECTRONIC DEVICE AND METHOD FOR CORRECTING IMAGE ON BASIS OF IMAGE TRANSMISSION STATE

TECHNICAL FIELD

Various embodiments of the disclosure relate to a method for correcting an image based on a transmission state when the image is transmitted to another device, and an electronic device including the method.

BACKGROUND ART

Various electronic devices such as a smartphone, a tablet PC, a portable multimedia player (PMP), a personal digital assistant (PDA), a laptop PC, and a wearable device (for example, a wrist watch or a head-mounted display (HMD)) may include cameras, which are used to capture images.

Users may upload images captured by using the cameras of the electronic devices to external electronic devices.

DISCLOSURE OF INVENTION

Technical Problem

Various embodiments of the disclosure relate to a method for correcting an image based on an image transmission state, and an electronic device including the method, wherein a cloud service may be used to process the image.

Various embodiments of the disclosure relate to a method for correcting an image based on an image transmission state, and an electronic device including the method, wherein the image may be processed by using information provided by a cloud service according to a network or communication state.

Solution to Problem

An electronic device according to various embodiments of the disclosure may include: a camera; one or more communication modules; one or more memories; and one or more processors. The processor may be configured to: acquire a raw image of an external object by using the camera; generate a small raw image corresponding to the raw image; determine whether transmission of the small raw image from the electronic device to an external device is currently possible, by using at least a part of the one or more communication modules; when the transmission of the small raw image is determined to be currently possible, transmit the small raw image to an external electronic device so that the external electronic device generates first correction information by using the small raw image and based on a correction processing scheme of the external device, and receive the first correction information from the external device; when the transmission of the small raw image is determined to be currently impossible, determine context information of the image and identify second correction information which is generated based on the context information; and by using one corresponding correction information, among the first correction information and the second correction information, generate a corrected image which is obtained by correcting the raw image.

A method according to various embodiments of the disclosure may be a method for correcting an image based on an image transmission state by an electronic device, the method including the operations of: acquiring a raw image of an external object by using a camera; generating a small raw image corresponding to the raw image; determining whether transmission of the small raw image from the electronic device to an external device is currently possible, by using at least a part of the one or more communication modules; when the transmission of the small raw image is determined to be currently possible, transmitting the small raw image to an external electronic device so that the external electronic device generates first correction information by using the small raw image and based on a correction processing scheme of the external device, and receiving the first correction information from the external device; when the transmission of the small raw image is determined to be currently impossible, determining context information of the image and identifying second correction information which is generated based on the context information; and by using one corresponding correction information, among the first correction information and the second correction information, generating a corrected image which is obtained by correcting the raw image.

Advantageous Effects of Invention

A method for correcting an image based on an image transmission state, and an electronic device including the method, according to various embodiments of the disclosure, may process the image by using a cloud service, thereby providing various images to the user.

A method for correcting an image based on an image transmission state, and an electronic device including the method, according to various embodiments of the disclosure, may process the image by changing the timepoint at which information provided by a cloud service is received, based on a network or communication state, or by using information already received from the cloud service and stored in the electronic device, thereby maintaining constant image quality.

A method for correcting an image based on an image transmission state, and an electronic device including the method, according to various embodiments of the disclosure, may provide image capture information based on a network or communication state, thereby providing the user with information regarding cloud service use.

MODE FOR THE INVENTION

Figure 1:
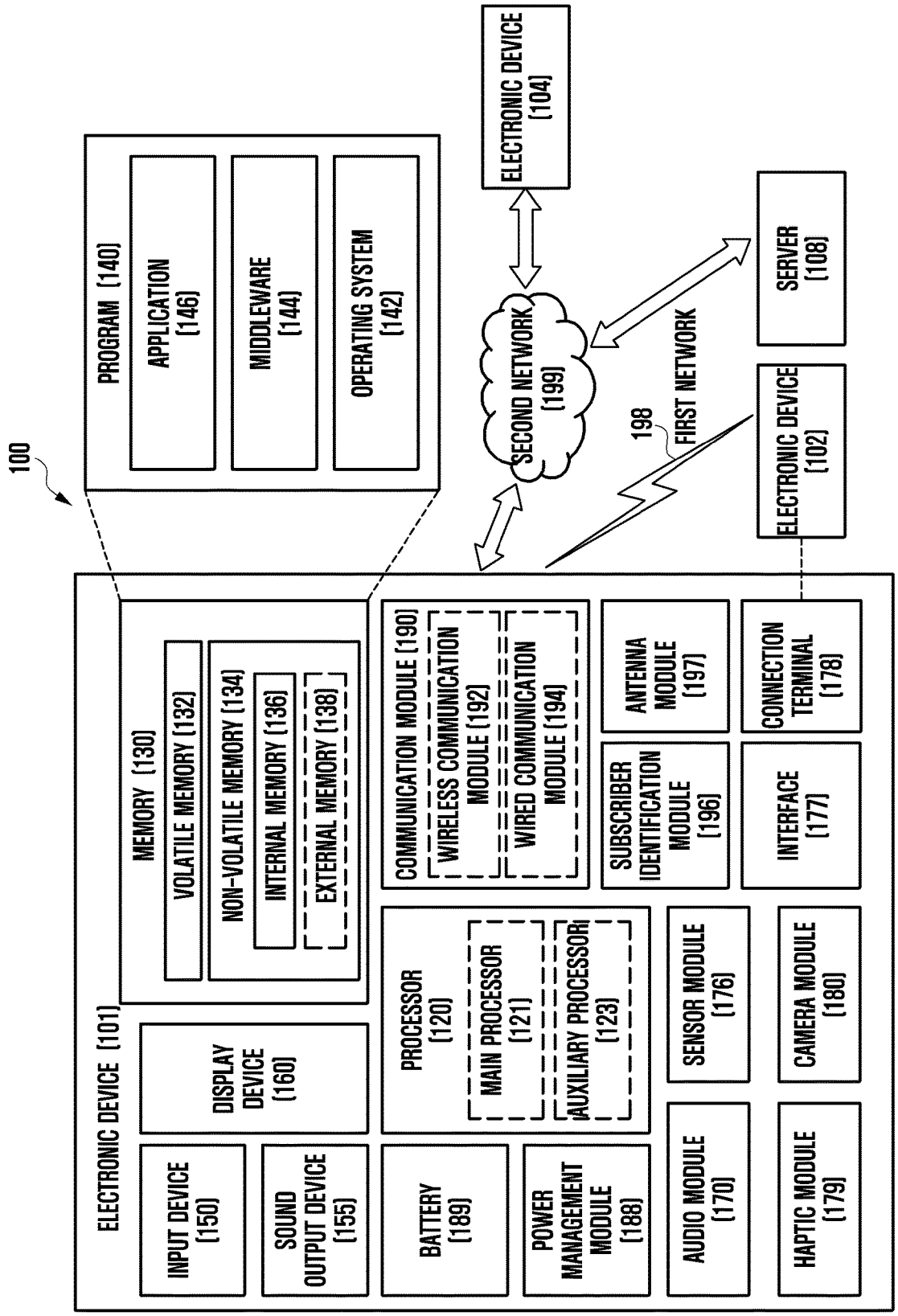
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The power management module 188 may manage power supplied to the electronic device 101. According to one embodiment, the power management module 188 may be implemented as at least part of, for example, a power management integrated circuit (PMIC).

The electronic device 101 may include at least one camera module 180, and may be configured with a front camera and a rear camera located on the opposite side.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
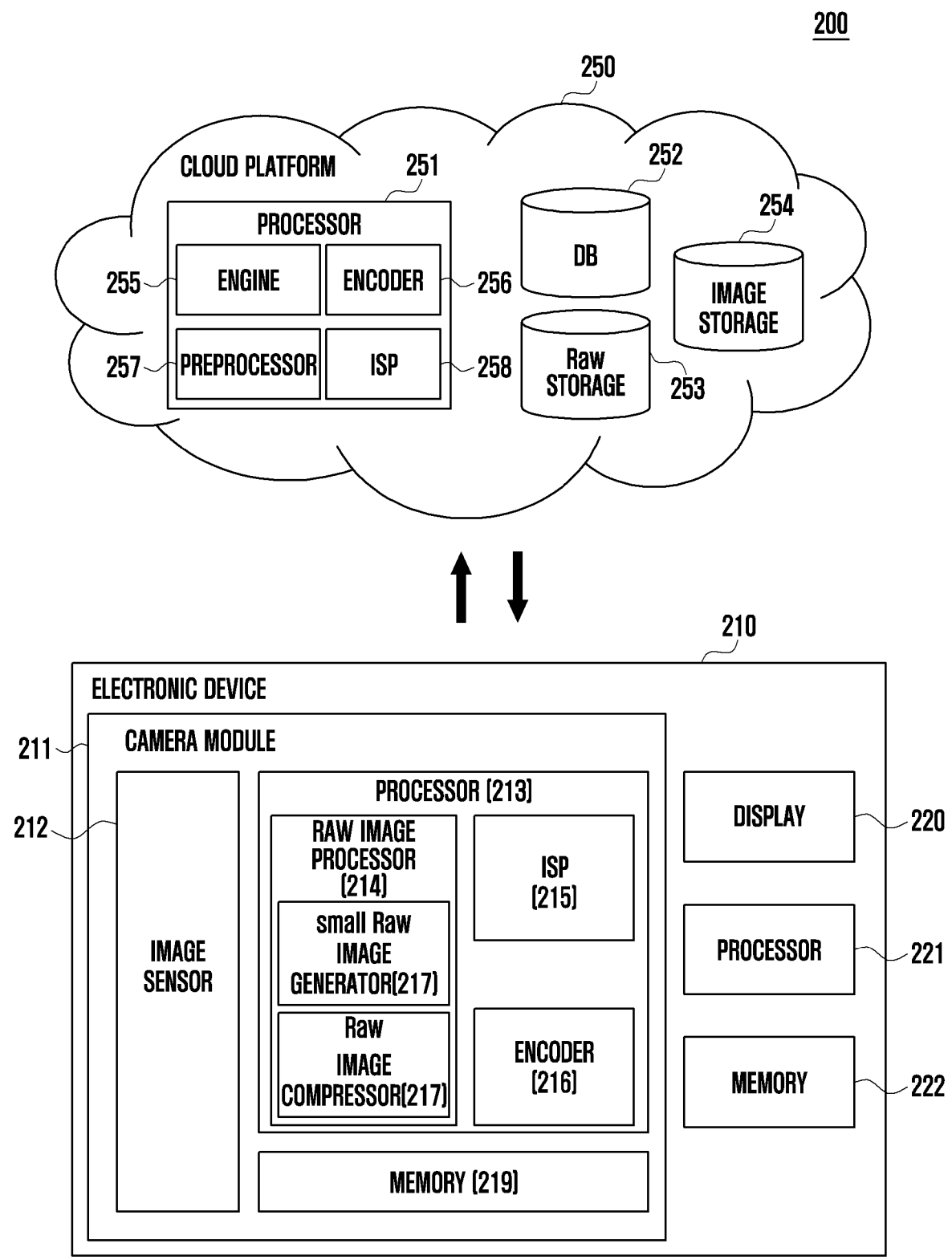
FIG. 2 is a block diagram of an electronic device and a cloud platform according to various embodiments.

FIG. 2 is a block diagram 200 of an electronic device 210 and a cloud platform 250 according to various embodiments. Referring to FIG. 2, the electronic device 210 may include a camera module 211, a display 220, a processor 221, and memories 219 and 222. The electronic device 210 of FIG. 2 is the same as the electronic device 101 of FIG. 1. The camera module 211 of FIG. 2 is the same as the camera module 180 of FIG. 1. The display 220 of FIG. 2 is the same as the display device 160 of FIG. 1. The processors 213 and 221 of FIG. 2 are the same as the processor 120 of FIG. 1. The memories 219 and 222 of FIG. 2 are the same as the memory 130 of FIG. 1.

The camera module 211 may include an image sensor 212, a processor 213, and a memory 219. The processor 213 may include a raw image processor 214, an image signal processor (ISP) 215, and an encoder 216.

The image sensor 212 may acquire various raw images of a subject. The image sensor 212 may acquire various types of raw images according to a color filter array (CFA) pattern. When a dual pixel (DP or 2PD) structure of the image sensor 212 is used, an image sensor 212 including different phase difference (or parallax) information in one pixel can be obtained. Multiple image sensors having the same or different characteristics (e.g., dual sensors (e.g., RGB+RGB, RGB+Mono, or Wide+Tele, etc.), array sensors (e.g., two or more sensors are attached)) can be used to obtain one or more image sensors 212 for one scene. The obtained image sensor 212 may be stored in the memory 222 as it is or through additional processing.

The image sensor 212 may obtain an image corresponding to the subject by converting the light transmitted from the subject through a lens assembly (not shown) into an electrical signal. According to an embodiment, the image sensor 212 may include one image sensor, a plurality of image sensors having the same property, or a plurality of image sensors having different properties selected from among image sensors having different properties such as an RGB sensor, a black and white (BW) sensor, an IR sensor, and a UV sensor. Each image sensor included in the image sensor 212 may be implemented by, for example, a charge coupled device (CCD) sensor or a complementary metal oxide semiconductor (CMOS) sensor.

The camera module 211 may further include a lens assembly (not shown), a flash (not shown), and an image stabilizer (not shown).

The lens assembly (not shown) may collect light emitted from the subject to be photographed. The lens assembly (not shown) may include one or more lenses.

According to an embodiment, the camera module 211 may include a plurality of lens assemblies (not shown). In this case, the camera module 211 may be, for example, a dual camera, a 360-degree camera, or a spherical camera. The plurality of lens assemblies (not shown) may have the same lens properties (e.g., angle of view, focal length, autofocus, f number, or optical zoom), or at least one lens assembly may have at least one different lens property from the other lens assemblies. The lens assembly (not shown) may include, for example, a wide-angle lens or a telephoto lens. The flash (not shown) may emit a light source used to enhance the light emitted from the subject. The flash (not shown) may include one or more light emitting diodes (e.g., red-green-blue (RGB) LED, white LED, infrared LED, or ultraviolet LED), or a xenon lamp.

In response to movement of the camera module 212 or the electronic device 210 including the same, the image stabilizer (not shown) can move at least one lens or the image sensor 212 included in the lens assembly (not shown) in a specific direction or control the same (e.g., adjusting readout timing) in order to at least partially compensate for the negative impact (e.g., image blurring) of the movement on the image being captured. According to an embodiment, the image stabilizer (not shown) may be implemented by, for example, an optical image stabilizer, and may sense the movement by using a gyro sensor (not shown) or an acceleration sensor (not shown) disposed inside or outside the camera module 212.

The raw image may be configured by various formats (e.g. Bayer format). The raw image may be represented by one color among red (R), green (G), and blue (B) colors of the pixel of the image sensor 212, and may be represented by a bit depth of 8 to 16 bits. Various color filter array (CFA) patterns may be applied to a raw image. A raw image may be a raw image having a layer structure including information on a plurality of colors (e.g., multiple colors among R, G, and B) for one pixel. A raw image may include not only color information (e.g., RGB) but also phase difference information according to various configurations of the image sensor 212. Information related to the image capturing (e.g., time, location, illumination) may be generated as metadata and stored in association with the raw image.

The processors 213 and 221 of the electronic device may perform various operations associated with image processing. Various image processing modules (e.g., raw image processor 214, ISP 215, and encoder 216) may be included in one processor or may be distributed in the plurality of processors 213 and 221. The processor 213 may be disposed inside the camera module 211, outside the camera module 211 (e.g., electronic device 210, or one or more servers configuring a part of the cloud platform 250), or both inside and outside the camera module 211. Various tasks may be processed by one processor or may be processed by a plurality of processors in a distributed manner.

The raw image processor 214 may perform various processing operations for the raw image obtained by the image sensor 212. The raw image processor 214 may perform lens distortion compensation for the raw image or may remove some noise from the raw image. Since raw images can be quite large in data size, the raw image processor 214 may reduce the data size of a raw image through various processing operations (e.g., down scaling, down sampling, or compression) before storing, processing, or transmitting the raw image.

A small raw image generator 217 may generate a small raw image by downscaling (e.g., reducing the size or lowering the resolution) or down-sampling (e.g., taking only one or some sample among a series of samples) a raw image.

The raw image compressor 218 may compress a raw image or a small raw image by using various image compression algorithms.

The ISP 215 performs various image processing operations for a raw image by using recipe information including various information about the raw image analyzed by the engine 257. The electronic device 210 may receive recipe information from the cloud platform 250 and perform raw image processing based on the recipe information through the ISP 215. For example, the electronic device 210 can perform composite image processing by using image processing provided by an embedded ISP and image processing based on the recipe information. When image processing is performed in the cloud platform 250, raw image processing based on the recipe information may be performed through the ISP 258 included in the cloud platform 250. The ISP 258 of the cloud platform 250 may receive additional information (e.g., feature vector) corresponding to the recipe information from the database 252 and use the additional information for image processing. The processed image may be transmitted to the electronic device 210 or stored in the image storage 254 of the cloud platform 250. Image processing may include functions such as white balancing, color adjustment, noise reduction, sharpening, and detail enhancement. These functions can be performed for each region of the image based on the recipe information.

The ISP 215 may apply image processing operations (e.g., depth map generation, three-dimensional modeling, panorama generation, feature point extraction, image synthesis, and image compensation (e.g., noise reduction, resolution adjustment, brightness adjustment, blurring, sharpening, or softening) to an image obtained through the image sensor 212 or an image stored in the memories 219 and 222. Additionally or alternatively, the ISP 215 may control at least one (e.g., image sensor 212) of the elements included in the camera module 211 (e.g., exposure time control, or read-out timing control). For further processing, the image processed by the ISP 215 may be stored again in the memory 250 or may be transmitted to an external element (e.g., memory 130, display device 160, electronic device 102, electronic device 104, or server 108) of the camera module 180. According to an embodiment, the ISP 215 may be implemented as a part of the processors 213 and 221 or may be implemented as a separate processor operating independently of the processors 213 and 221. If implemented as a separate processor, the images processed by the ISP 215 may be displayed on the display 220 as they are or after performing additional image processing by the processors 213 and 221.

The encoder 216 may encode a raw image to produce an image file (e.g., JPEG, MPEG, or 360-degree video).

The electronic device 210 may include a memory 219 inside the camera module 211 and/or a memory 222 outside the camera module 211. The memories 219 and 222 may store a raw image, a small raw image, an image file, and an image-processed raw image. The memories 219 and 222 may at least temporarily store at least a part of the image obtained through the image sensor 212 for subsequent image processing. For example, if image acquisition is delayed according to the shutter or a plurality of images are obtained at high speed, the obtained original image (e.g., high resolution image) may be stored in the memories 219 and 222, and a corresponding copied image (e.g., low resolution image) may be previewed on the display 220. Thereafter, if a specified condition is satisfied (e.g., user input or system command), at least a part of the original image that has been stored in the memories 219 and 222 may be acquired and processed by, for example, the ISP 215. According to an embodiment, the memory 219 may be at least a part of the memory 222, or may be a separate memory operating independently of the memory 222.

The electronic device 210 may include a display 222 (i.e., the display 160 of FIG. 1).

The cloud platform 250 as an external device may include a processor 251, a database 252, a raw image storage 253, and an image storage 254. The processor 251 may include an engine 255 (e.g., recognition engine), an encoder 256, a preprocessor 257, and an ISP 258.

The processor 251 of the cloud platform 250 may perform various operations related to image processing. Various image processing modules (e.g., engine 255, encoder 256, preprocessor 257, and ISP 258) may be included in one processor or may be distributed among multiple processors.

The engine 255 analyzes an image (e.g., raw image, small raw image, and image file) to generate various meaningful information (e.g., object recognition, velocity vector, face recognition, segmentation, and scene parsing). To this end, the engine 255 may include various algorithms. As a result of analysis, the engine 255 may generate, store, or transmit information (recipe information (for example, information including segments, layers, vectors, or scene categories)), which can be used by the ISP for various image processing operations, in association with an image.

The encoder 256 may encode a raw image to produce an image file (e.g., JPEG, MPEG, or 360-degree video).

The preprocessor 257 may perform necessary operations on a raw image received from the electronic device 210 before transmitting the raw image to the engine 255 or the ISP 258. The preprocessor 257 can perform operations such as decompression of a compressed raw image, simple image quality enhancement, demosaic processing, and image format conversion.

The ISP 258 performs various image processing operations for a raw image by using the recipe information including various information about the raw image analyzed by the engine 257. The electronic device 210 may receive recipe information from the cloud platform 250 and perform raw image processing based on the recipe information through the ISP 215. For example, the electronic device 210 can perform image processing provided by the embedded ISP and image processing based on the recipe information in a composite manner. When image processing is performed in the cloud platform 250, raw image processing may be performed based on the recipe information through the ISP 258 included in the cloud platform 250. The ISP 258 included in the cloud platform 250 may receive additional information (e.g., feature vector) corresponding to the recipe information from the database 252 and use the same for image processing. The processed image may be transmitted to the electronic device 210 or may be stored in the image storage 254 of the cloud platform 250. Image processing may include functions such as white balancing, color adjustment, noise reduction, sharpening, and detail enhancement. These functions can be performed for each region of the image based on the recipe information.

The database 252 may store features corresponding to the image categories. The raw image storage 253 may store raw images. The image storage 254 may store image files.

Figure 3:
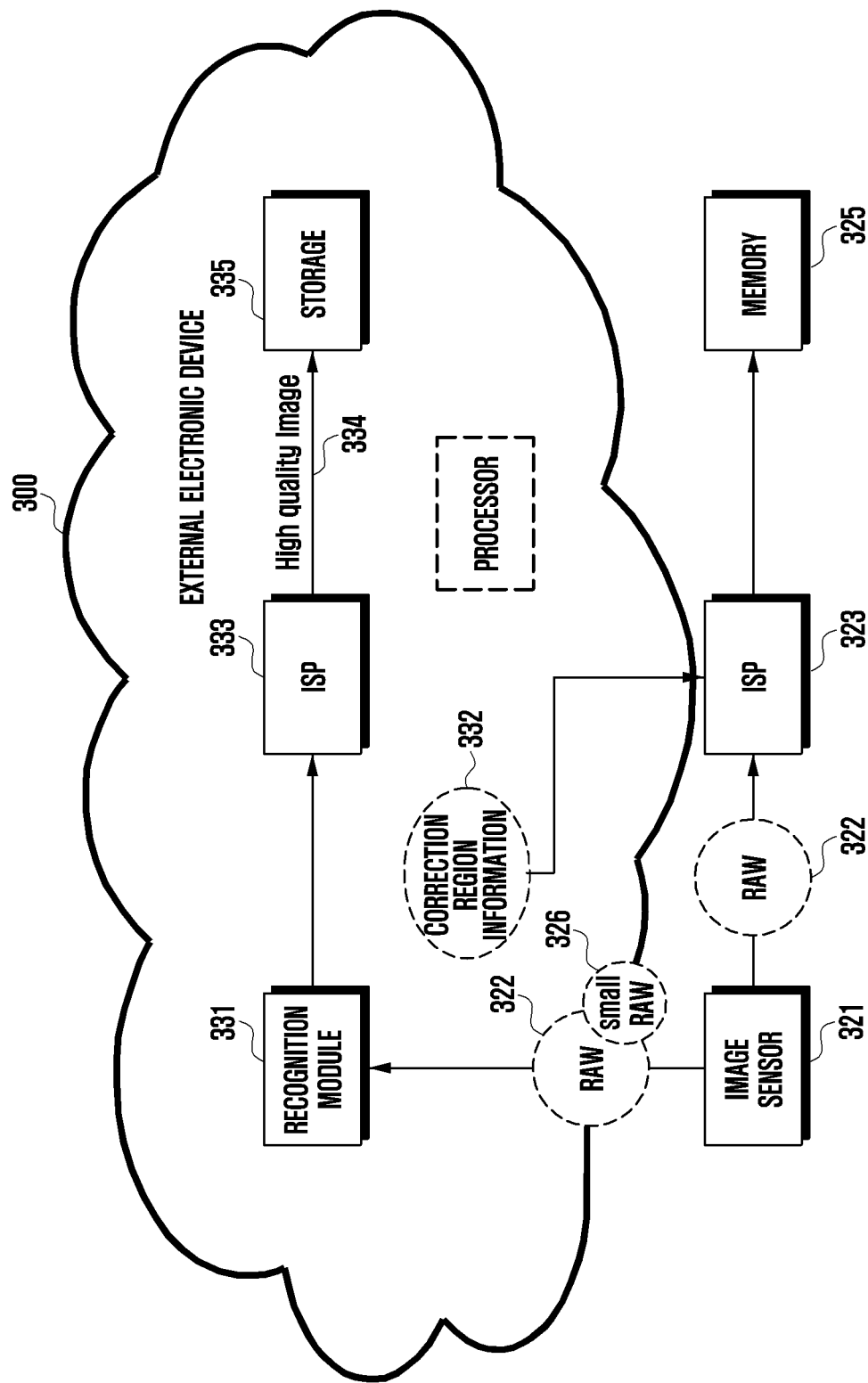
FIG. 3 is a conceptual diagram illustrating the operation of an electronic device and an external electronic device according to various embodiments of the disclosure.

FIG. 3 is a conceptual diagram illustrating the operation of an electronic device 101 and an external electronic device 300 (e.g., the server 108) according to various embodiments of the disclosure.

The electronic device 101 may include an image sensor 321, an ISP 323, and a memory 325. The external electronic device 300 may include a recognition module 331, an ISP 333, and a storage 335. The recognition module 331 may be a logic module or may be implemented as a processor of the external electronic device 300. The ISP 333 may also be implemented as a processor of the external electronic device 300, and for example, the processor of the external electronic device 300 may perform both recognition and image processing. Although not shown, the electronic device 101 may include a communication module (e.g., a communication interface 170 or a communication module 220) capable of transmitting or receiving data to or from the external electronic device 300. The external electronic device 300 may include a communication module capable of transmitting or receiving data to or from the electronic device 101.

The image sensor 321 (e.g., the camera module 291) may acquire an image of an external object, and may generate a raw image 322 (raw image) corresponding thereto. The image sensor 321 may transmit the raw image 322 to the ISP 323. In various embodiments of the disclosure, the image sensor 321 may generate a small raw image 321 and transmit the generated small raw image to the external electronic device 300 through a communication module. In another embodiment, the processor of the electronic device 101 instead of the image sensor 321 may generate the small raw image 321, and may transmit the generated small raw image 321 to an external electronic device 300 through a communication module. The image sensor 321 may transmit the raw image 322 in a compressed state to the ISP or the external electronic device 300. The image sensor 321 may compress the raw image 322 for partial processing and store the compressed raw image in a memory inside the image sensor 321. The recognition module 331 of the external electronic device 300 may acquire the small raw image 321 through the communication module, and may segment at least one image region in the small raw image 321. The recognition module 321 may recognize each of at least one image region segmented according to a result of the segmentation. Information associated with a plurality of image regions generated by the recognition module 321, for example, correction region information 332 including at least one of coordinate information and recognition results of the image region may be generated. The correction region information 332 may be transmitted to the electronic device 101. The ISP 323 may correct the raw image 322 by using the correction region information 332, and accordingly, the corrected image 324 may be generated. The corrected image 324 may have a YUV format, for example. The corrected image 324 may be stored in the memory 325. Alternatively, the corrected image 324 may be compressed according to, for example, a JPEG method, and the compressed image may be stored in the memory 325. In various embodiments of the disclosure, the raw image 322 provided from the image sensor 321 may be transmitted to the external electronic device 300 separately from the small raw image 321. Since the raw image 322 has a larger capacity than the small raw image 321, the small raw image 321 is first transmitted to the external electronic device 300, and then the raw image 322 can be transmitted to the external electronic device 300. For example, while the ISP 323 corrects the raw image 322, the raw image 322 may be transmitted to the external electronic device 300. The raw image 322 may be uploaded to the external electronic device 300 as it is generated by the image sensor 321, or a preprocessed image in which lens distortion compensation or noise removal has been performed may be uploaded. The pre-processing described above may be performed in the external electronic device 300. The external electronic device 300 may perform demosaic processing, image format transformation, or pre-processing for increasing an image recognition rate. The ISP 333 of the external electronic device 300 may correct the received raw image 322. The external electronic device 300 may correct the raw image 322 by using the previously generated correction region information 332, or may correct the raw image 322 by using the extended correction region information. The raw image 322 may have a higher resolution than that of the small raw image 321, and accordingly, the ISP 333 of the external electronic device 300 may obtain more detailed extended correction region information from the high-resolution image. The ISP 333 may generate extended correction region information by using the previously generated correction region information and the raw image 322 together. The ISP 333 may obtain a high quality image 334 by correcting the raw image 322 by using the extended correction region information. The high-resolution image 334 may be stored in the storage 335 of the external electronic device 300 or may be downloaded to the electronic device 101.

The external electronic device 300 may be implemented as, for example, a cloud server, and accordingly, the ISP 333 of the external electronic device may be referred to as a cloud ISP. The ISP 333 of the external electronic device may perform at least one correction among original color mapping, detail re-generation, text reconstruction, image inpainting, scene based white balance (WB)/color adjustment, segmentation based noise reduction (NR)/sharpen or segmentation based detail enhancement.

Figure 4:
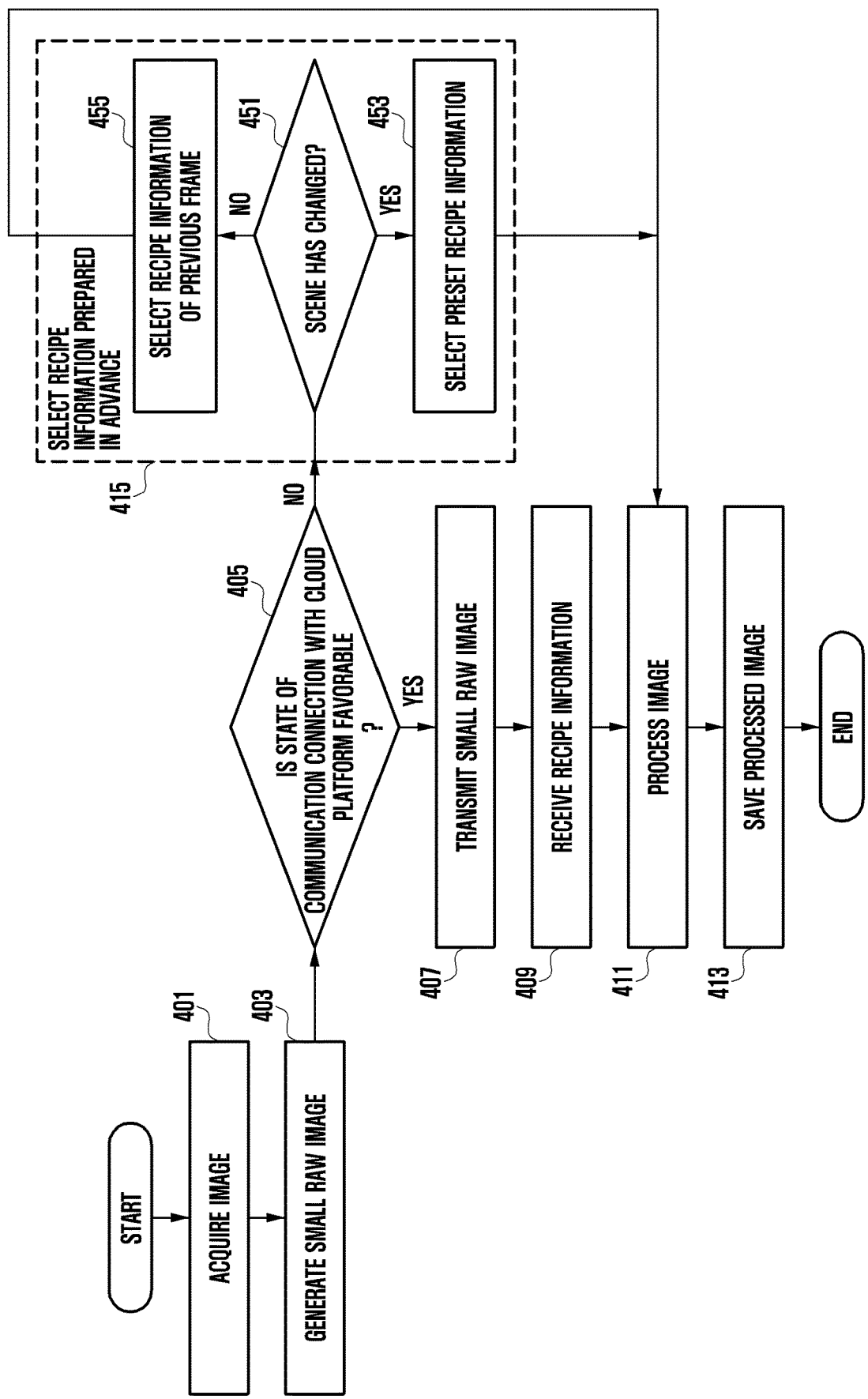
FIG. 4 is a flowchart illustrating an image processing method according to a network state according to various embodiments of the disclosure.

FIG. 4 is a flowchart illustrating an image processing method according to a network state according to various embodiments of the disclosure.

In operation 401, the electronic device 210 may acquire an image of an external object by using the camera module 211 according to a user input under the control of one or more processors 213 and 221.

When the camera function is executed, the electronic device 210 may acquire an image by using the camera module 211 according to a user input. At least one object may be included in the image acquired through the camera module 211.

In operation 403, the electronic device 210 may generate a small raw image (e.g., a small raw image 321 in FIG. 3) by using the acquired image under the control of one or more processors 213 and 221.

The electronic device 210 may generate a small raw image by down-scaling (for example, an operation of reducing the size or lowering the resolution) or down-sampling (for example, an operation of taking one or a part of a sampled series of samples) the acquired image (for example, the raw image). In addition, the electronic device 210 may compress the acquired image or the small raw image by using various image compression algorithms.

In various embodiments, the electronic device 210 may generate a small raw image by down-scaling (for example, an operation of reducing the size or lowering the resolution) or down-sampling (for example, an operation of taking one or a part of a sampled series of samples) the acquired image (for example, the raw image) by using the small raw image generator 217. In addition, the raw image compressor 218 of the electronic device 210 may compress the acquired image or the small raw image by using various image compression algorithms.

In operation 405, the electronic device 210 may determine whether a state of communication connection with the cloud platform 250 is favorable under the control of one or more processors 213 and 221. In operation 405, the operation of determining, by electronic device 210, whether a state of communication connection with the cloud platform 250 is favorable may be an operation of determining whether a communication connection with the cloud server is currently possible.

In operation 405, the operation of determining, by the electronic device 210, whether or not the communication connection with the cloud platform 250 is favorable under the control of one or more processors 213 and 221 may be an operation of determining whether or not a desired raw image can be transmitted in the current environment, and the operation of determining whether or not the desired raw image can be transmitted in the current environment may be an operation of determining whether a communication throughput is at a specified level (e.g., a connection state of more than 50 Mbps upload).

For example, if the communication network is in a state of being connected to a 3G environment or is in a state of being connected at a limited speed in a 4G or 5G environment, transmission of a small raw image to the cloud platform 250 is quite limited, and thus raw image transmission is determined to be currently impossible although the communication is connected.

For example, the electronic device 210 may determine, as a favorable state of communication connection with the cloud platform 250, a state in which transmission of the generated small raw image to the cloud platform 250 is possible or a state in which the electronic device 210 can receive recipe information from the cloud platform 250.

On the contrary, the electronic device 210 may determine, as an unfavorable (poor) state of communication connection with the cloud platform 250, a state in which transmission of the generated small raw image to the cloud platform 250 is impossible or a state in which the electronic device 210 cannot receive recipe information from the cloud platform 250.

In various embodiments, the operation of determining whether a state of communication connection with the cloud platform 250 is favorable by the electronic device 210 in operation 405 is as follows.

For example, when information on the connection state of a communication channel currently being connected or to be connected is transmitted to one or more processors 213 and 221 by a connection manager that manages wireless connection, the one or more processors 213 and 221 may determine whether or not the state of communication with the cloud platform 250 is favorable by using the information on the connection state of the communication channel.

The information on the connection state of the communication channel may include at least one of information on a communication transmission/reception throughput, communication signal strength, and a communication volume of another communication device in the base station.

In various embodiments, if the communication transmission/reception throughput is higher than the preset transmission/reception throughput based on the information on the connection state of the communication channel, the one or more processors 213 and 221 may determine that the state of communication with the cloud platform 250 is favorable, and if the communication transmission/reception throughput is lower than or equal to the preset transmission/reception throughput, the one or more processors 213 and 221 may determine that the state of communication with the cloud platform 250 is not favorable.

In various embodiments, based on the information on the connection state of the communication channel, if the communication signal strength is greater, and thus better, than the preset signal strength, the one or more processors 213 and 221 may determine that the state of communication with the cloud platform 250 is favorable, and if the communication signal strength is smaller than or equal to the preset signal strength, the one or more processors 213 and 221 may determine that the state of communication with the cloud platform 250 is not favorable.

In various embodiments, based on the information on the connection state of the communication channel, if the communication volume of the other communication device is smaller than or equal to the preset communication volume, the one or more processors 213 and 221 may determine that the state of communication with the cloud platform 250 is favorable, and if the communication volume of the other communication device is equal to or greater than the preset communication volume, the one or more processors 213 and 221 may determine that the state of communication with the cloud platform 250 is not favorable.

Referring to FIG. 1, when describing the connection manager in detail, the program 140 includes an operating system that controls resources related to the electronic device 101 and/or various applications (e.g., application programs 146) running on the operating system). The operating system may include, for example, Android™, iOS™, Windows™, Symbian™, Tizen™, or Bada™.

Referring to FIG. 1, the program 140 may include an operating system 142, a kernel, middleware 144, an application programming interface (API), and/or an application program 146. The middleware 144 may provide, for example, a function commonly required by the application 146, or may provide various functions to the application 370 through an API so that the application 146 can use limited system resources inside the electronic device. The middleware 144 may include at least one of a runtime library, an application manager, a window manager, a multimedia manager, a resource manager, a power manager, a database manager, a package manager, a connection manager, a notification manager, a location manager, a graphic manager, or a security manager. The connection manager may manage communication connections, for example.

If it is determined that the state of communication with the cloud platform 250 is favorable, the process of the electronic device 210 may branch from operation 405 to operation 407.

If it is determined that the state of communication with the cloud platform 250 is favorable, the electronic device 210 may transmit the small raw image to the cloud platform 250 through a communication module (e.g., the communication module 190 of FIG. 1) under the control of one or more processors 213 and 221, in operation 407.

In operation 409, the electronic device 210 may receive recipe information from the cloud platform 250 through the communication module (e.g., the communication module 190 of FIG. 1) under the control of one or more processors 213 and 221.

The recipe information may be the same as the recipe information of FIG. 2 or the correction region information 332 mentioned in FIG. 3. The cloud platform 250 may segment at least one image region in a small raw image (e.g., the small raw image 321 of FIG. 3). The cloud platform 250 may recognize each of at least one image region segmented according to a result of the segmentation. The cloud platform 250 may generate recipe information including at least one of pieces of information associated with a plurality of generated image regions, for example, coordinate information (vector information), segment information, layer information, a result of recognition, and scene category information of the image region, and may transmit the generated recipe information to the electronic device 210.

In operation 411, the electronic device 210 may process the acquired image by using the received recipe information or pre-prepared recipe information under the control of one or more processors 213 and 221.

In various embodiments, if it is determined that the state of communication with the cloud platform 250 is favorable, the electronic device 210 may process the acquired image by using the received recipe information under the control of one or more processors 213 and 221 in operation 411.

The ISP 215 of the electronic device 210 performs various image processing of the acquired image (e.g., raw image) by using the received recipe information. The electronic device 210 may receive recipe information from the cloud platform 250 and perform raw image processing based on the recipe information through the ISP 215.

Image processing may include image processing operations such as white balance, color adjustment, noise reduction, sharpening, and detail enhancement. These image processing operations may be performed for each image region based on the recipe information.

In operation 413, the electronic device 210 may store the processed image in the one or more memories 219, 222, and 254 under the control of one or more processors 213 and 221. In operation 413, the processed image is subjected to an encoding operation such as JPEG, and then the electronic device 210 may store the processed image in one or more memories 219 and 222 of the electronic device 210. Alternatively, if the electronic device 210 transmits the processed image to the cloud platform 250, the electronic device 210 may store the processed image in at least one memory (e.g., image storage 254) of the cloud platform 250 in operation 413.

If it is determined that the state of communication with the cloud platform 250 is not favorable or the communication state is determined to be poor, the process may branch from operation 405 to operation 415.

If it is determined that the state of communication with the cloud platform 250 is not favorable or that the communication state is poor, the electronic device 210 may select recipe information prepared in advance according to the context information under the control of one or more processors 213 and 221.

In operation 411, the electronic device 210 may process the acquired image by using the received recipe information or pre-prepared recipe information under the control of one or more processors 213 and 221.

In various embodiments, if it is determined that the state of communication with the cloud platform 250 is not favorable or that the communication state is poor, the electronic device 210 may process the acquired image based on the prepared recipe information under the control of one or more processors 213 and 221 in operation 411.

In various embodiments, the ISP 215 of the electronic device 210 may perform various image processing of the acquired image (e.g., a raw image) by using pre-prepared recipe information.

In various embodiments, the pre-prepared recipe information may be one of a plurality of pieces of recipe information preset inconsideration of various situations in the electronic device 210. The electronic device 210 may determine that, among a plurality of pieces of preset recipe information, at least one piece of recipe information corresponding similarly or identically to the current screen or scene acquired through the camera module 211 in terms of the object, brightness, color, and the like is pre-prepared recipe information of choice.

In various embodiments, the pre-prepared recipe information may be recipe information, which is received at a time close to a time when the current screen or scene is acquired through the camera module 211, from among pieces of recipe information received from the cloud platform 250.

In various embodiments, if it is determined that the state of communication with the cloud platform 250 is not favorable or the communication state is determined to be poor, the operation of selecting, by the electronic device 210, recipe information prepared in advance according to the context information about the image under the control of one or more processors 213 and 221 in operation 415 may be as follows. Operation 415 of the electronic device 210 may include operation 451, operation 453, and operation 455.

In various embodiments, if it is determined that the state of communication with the cloud platform 250 is not favorable or that the communication state is poor, the electronic device 210 may determine context information about the image in operation 451. The context information about the image may be a change in the current screen or scene acquired through the camera module 211.

In various embodiments, if it is determined that the state of communication with the cloud platform 250 is not favorable or the communication state is determined to be poor, the electronic device 210 may determine whether there is a change in the current screen or scene acquired through the camera module 211 in operation 451. The operation of determining whether there is a screen or scene change by the electronic device 210 may include: comparing the currently acquired frame with the previous frame; when the degree of change in the color or brightness of the screen is equal to or larger than a preset condition, determining that there is a change in the screen or scene; and when the degree of change in the color or brightness of the screen is equal to or less than a preset condition, determining that there is no change in the screen or scene.

If it is determined that there is a change in the current screen or scene acquired through the camera module 211, the process of the electronic device 210 may branch from operation 451 to operation 453.

If it is determined that there is a change in the current screen or scene acquired through the camera module 211, the electronic device 210 may select one or more pieces of recipe information from among a plurality of pieces of preset recipe information under the control of one or more processors 213 and 221 in operation 453.

In various embodiments, the electronic device 210 may determine that, among a plurality of pieces of preset recipe information, at least one piece of recipe information corresponding similarly or identically to the current screen or scene acquired through the camera module 211 in terms of the object, brightness, color, and the like is pre-prepared recipe information of choice, under the control of one or more processors 213 and 221 in operation 453.

In various embodiments, the operation of selecting, by the electronic device 210, one or more recipe information from among a plurality of pieces of recipe information under the control of one or more processors 213 and 221 in operation 453 may be as follows.

The one or more processors 213 and 221 may perform a scene analysis of an image based on the current frame acquired through the camera module 211, and may select, as recipe information, one or more of a plurality of pieces of recipe information based on the analyzed scene.

In an operation of analyzing the scene of the image based on the frames acquired by the one or more processors 213 and 221, the one or more processors 213 and 221 may analyze the depth of the image, etc., segment at least one image region by using the analyzed depth, and calculate segmentation information for each region. The one or more processors 213 and 221 may calculate entire scene characteristics and brightness information for each region (e.g., ISO information and illumination information) by using the calculated segmentation information.

The one or more processors 213 and 221 may determine a parameter value for each region of the segmented image by using the calculated brightness information and scene characteristics.

The one or more processors 213 and 221 may select recipe information corresponding to the calculated brightness information, scene characteristics, and a parameter value for each region from among a plurality of pieces of recipe information stored in the memory 219.

The one or more processors 213 and 221 or the ISP 215 may process the image by using recipe information selected in response to the calculated brightness information, scene characteristics, and a parameter value for each region.

If it is determined that there is no change in the current screen or scene acquired through the camera module 221, the process of the electronic device 210 may branch from operation 451 to operation 455.

If it is determined that there is no change in the current screen or scene acquired through the camera module 211, the electronic device 210 may select the recipe information of the previous frame under the control of one or more processors 213 and 221 in operation 455. The recipe information of the previous frame may be recipe information, which is received at a time close to a time when the current screen or scene is acquired through the camera module 211, from among pieces of recipe information received from the cloud platform 250.

The recipe information selected in operation 453 is recipe information calculated and generated by the electronic device 210, and the recipe information received in operation 409 and the recipe information selected in operation 455 are recipe information calculated and generated by the cloud platform 250. The recipe information received in operation 409 may be recipe information received by the electronic device 210 from the cloud platform 250 in real time or according to a frame generation period, and the recipe information selected in operation 455 may be recipe information received by the electronic device 210 from the cloud platform 250 at the previous time or the previous frame.

Table 1 shows a comparison of recipe information calculated and generated by the cloud platform 250 with recipe information calculated and generated by the electronic device 210.

TABLE 1

| Recipe information calculated and generated by the cloud platform 250 | Recipe information calculated and generated by the electronic device 210 |
|---|---|
| Segmentation map | Segmentation map |
| Segmentation confidence map | Segmentation confidence map |
| Depth map | Depth map |
| Depth confidence map | Depth confidence map |
| Scene recognition information | Parameter for each image region |
| Scene parsing information | Recognition information (person) |
| Parameter for each image region | |
| Recognition information (e.g., objects, people, textures) | |

Figure 5:
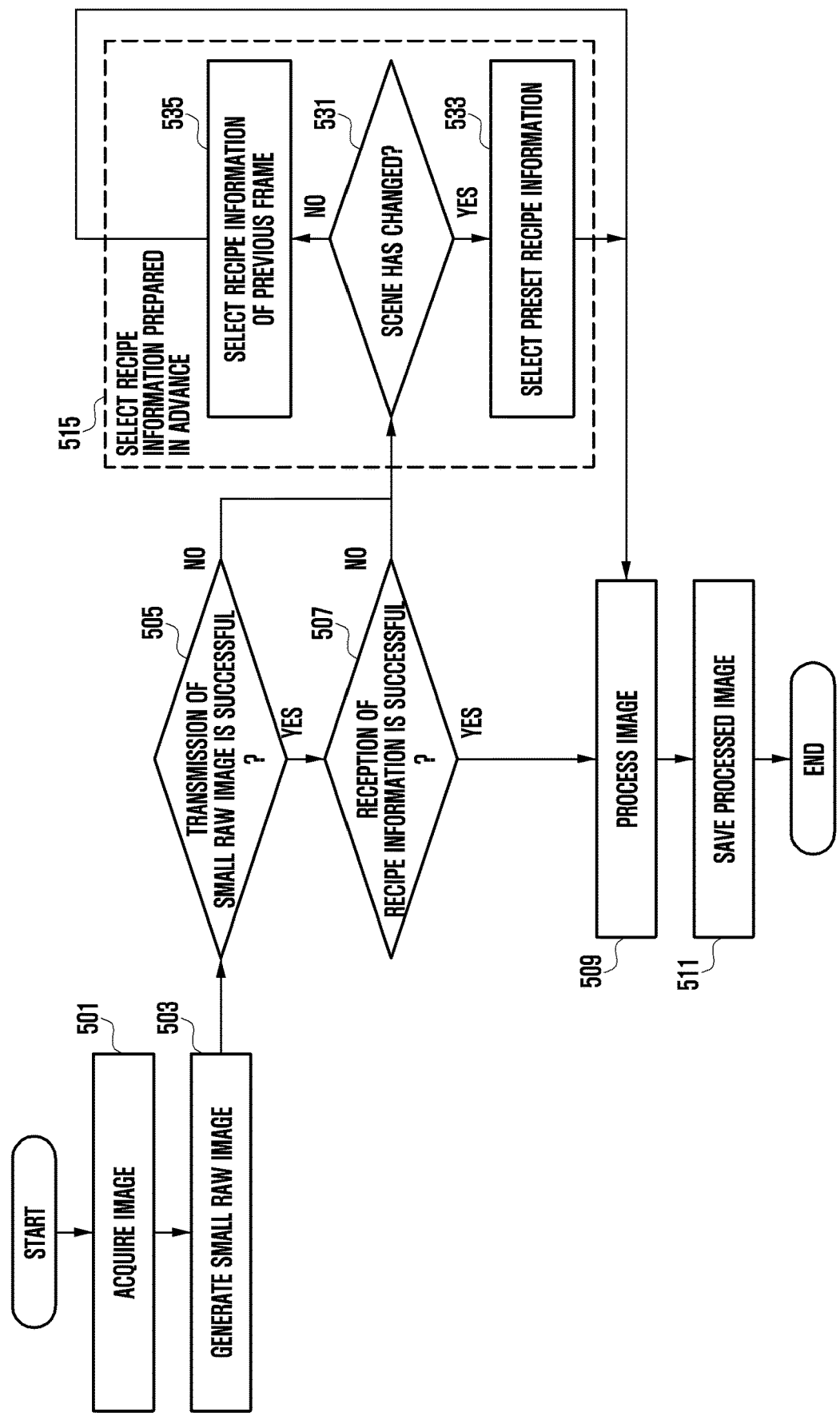
FIG. 5 is a flowchart illustrating an image processing method according to a network state according to various embodiments of the disclosure.

The recipe information calculated and generated by the cloud platform 250 and the recipe information calculated and generated by the electronic device 210 may differ in terms of accuracy. FIG. 5 is a flow chart illustrating an image processing method according to a network state according to various embodiments of the disclosure.

The electronic device 210 may acquire an image by using the camera module 211 according to a user input under the control of one or more processors 213 and 221 in operation 501.

When the camera function is executed, the electronic device 210 may acquire an image by using the camera module 211 according to a user input. At least one object may be included in the image acquired through the camera module 211.

In operation 503, the electronic device 210 may generate a small raw image (e.g., the small raw image 321 of FIG. 3) by using the acquired image under the control of one or more processors 213 and 221.

The electronic device 210 may generate a small raw image by down-scaling (for example, an operation of reducing the size or lowering the resolution) or down-sampling (for example, an operation of taking one or a part of a sampled series of samples) the acquired image (for example, raw image). In addition, the electronic device 210 may compress the acquired image or the small raw image by using various image compression algorithms.

In various embodiments, the electronic device 210 may generate a small raw image by down-scaling (for example, an operation of reducing the size or lowering the resolution) or down-sampling (for example, an operation of taking one or a part of a sampled series of samples) the acquired image (for example, the raw image) by using the small raw image generator 217. In addition, the raw image compressor 218 of the electronic device 210 may compress the acquired image or the small raw image by using various image compression algorithms.

In operation 505, the electronic device 210 may transmit the small raw image to the cloud platform 250 through a communication module (e.g., the communication module 190 of FIG. 1) under the control of one or more processors 213 and 221, and thus may determine whether the transmission is successful.

If transmission of the small raw image to the cloud platform 250 is successful, the process of the electronic device 210 may branch from operation 505 to operation 507.

If transmission of the small raw image to the cloud platform 250 is not successful, the process of the electronic device 210 may branch from operation 505 to operation 513.

In operation 507, the electronic device 210 attempts reception of recipe information from the cloud platform 250 through a communication module (e.g., the communication module 190 of FIG. 1) under the control of one or more processors 213 and 221 and attempts reception of recipe information for a predetermined time, and thus may determine whether the reception is successful.

If the electronic device 210 succeeds in receiving the recipe information from the cloud platform 250, the process of the electronic device 210 may branch from operation 507 to operation 509.

If the electronic device 210 does not succeed in receiving the recipe information from the cloud platform 250, the process of the electronic device 210 may branch from operation 507 to operation 513.

The recipe information may be the same as the recipe information of FIG. 2 or the correction region information 332 mentioned in FIG. 3. The cloud platform 250 may segment at least one image region in a small raw image (e.g., the small raw image 321 of FIG. 3). The cloud platform 250 may recognize each of at least one image region segmented according to a result of the segmentation. The cloud platform 250 may generate recipe information including at least one of information associated with a plurality of generated image regions, for example, coordinate information (vector information), segment information, layer information, a result of recognition, and scene category information of the image region, and may transmit the generated recipe information to the electronic device 210.

In operation 509, the electronic device 210 may process the acquired image by using the received recipe information or pre-prepared recipe information under the control of one or more processors 213 and 221.

In various embodiments, if reception of recipe information from the cloud platform 250 is successful, the electronic device 210 may process the acquired image by using the received recipe information under the control of one or more processors 213 and 221 in operation 509.

The ISP 215 of the electronic device 210 performs various image processing of the acquired image (e.g., raw image) by using the received recipe information. The electronic device 210 may receive recipe information from the cloud platform 250 and perform raw image processing based on the recipe information through the ISP 215.

Image processing may include image processing operations such as white balance, color adjustment, noise reduction, sharpening, and detail enhancement. These image processing operations may be performed for each image region based on the recipe information.

In operation 511, the electronic device 210 may store the processed image in the one or more memories 219, 222, and 254 under the control of one or more processors 213 and 221. In operation 511, the processed image is subjected to an encoding operation such as JPEG, and then the electronic device 210 may store the processed image in one or more memories 219 and 222 of the electronic device 210. Alternatively, if the electronic device 210 transmits the processed image to the cloud platform 250, the electronic device 210 may store the processed image in at least one memory (e.g., image storage 254) of the cloud platform 250 in operation 511.

If the electronic device 210 fails to transmit the small raw image to the cloud platform 250 or does not receive recipe information from the cloud platform 250, the electronic device 210 may select pre-prepared recipe information according to the context information about the image under the control of one or more processors 213 and 221 in operation 513.

In operation 509, the electronic device 210 may process the acquired image by using the received recipe information or pre-prepared recipe information under the control of one or more processors 213 and 221.

In various embodiments, if the electronic device 210 fails to transmit the small raw image to the cloud platform 250 or does not receive recipe information from the cloud platform 250, the electronic device 210 may process the image acquired based on the previously prepared recipe information under the control of one or more processors 213 and 221 in operation 509.

In various embodiments, the ISP 215 of the electronic device 210 may perform various image processing of the acquired image (e.g., a raw image) by using pre-prepared recipe information.

In various embodiments, the pre-prepared recipe information may be one of a plurality of pieces of recipe information preset in the electronic device 210 in consideration of various situations. The electronic device 210 may determine that, among a plurality of pieces of preset recipe information, at least one piece of recipe information corresponding similarly or identically to the current screen or scene acquired through the camera module 211 in terms of the object, brightness, color, and the like is pre-prepared recipe information of choice.

In various embodiments, the pre-prepared recipe information may be recipe information, which is received at a time close to a time when the current screen or scene is acquired through the camera module 211, from among pieces of recipe information received from the cloud platform 250.

In various embodiments, when the electronic device 210 fails to transmit the small raw image to the cloud platform 250 or fails to receive recipe information from the cloud platform 250, the operation of selecting, by the electronic device 210, recipe information prepared in advance according to the context information about the image under the control of one or more processors 213 and 221 in operation 513 may be as follows. Operation 513 of the electronic device 210 may include operation 531, operation 533, and operation 535.

In various embodiments, if it is determined that the state of communication with the cloud platform 250 is not favorable or that the communication state is poor, the electronic device 210 may determine context information about the image in operation 531. The context information about the image may be a change in the current screen or scene acquired through the camera module 211.

In various embodiments, when the electronic device 210 fails to transmit the small raw image to the cloud platform 250 or fails to receive recipe information from the cloud platform 250, the electronic device 210 may determine whether there is a change in the current screen or scene acquired through the camera module 211 in operation 531. The operation of determining whether there is a screen or scene change by the electronic device 210 may include: comparing the currently acquired frame with the previous frame; when the degree of change in the color or brightness of the screen is equal to or larger than a preset condition, determining that there is a change in the screen or scene; and when the degree of change in the color or brightness of the screen is equal to or less than a preset condition, determining that there is no change in the screen or scene.

If it is determined that there is a change in the current screen or scene acquired through the camera module 211, the process of the electronic device 210 may branch from operation 531 to operation 533.

If it is determined that there is a change in the current screen or scene acquired through the camera module 211, the electronic device 210 may select one or more pieces of recipe information from among a plurality of pieces of preset recipe information under the control of one or more processors 213 and 221 in operation 533.

In various embodiments, the electronic device 210 may determine that, among a plurality of pieces of preset recipe information, at least one piece of recipe information corresponding similarly or identically to the current screen or scene acquired through the camera module 211 in terms of the object, brightness, color, and the like is pre-prepared recipe information of choice, under the control of one or more processors 213 and 221 in operation 533.

In various embodiments, in operation 533, the operation of selecting, by the electronic device 210, one or more recipe information from among a plurality of pieces of recipe information under the control of one or more processors 213 and 221 may be as follows.

The one or more processors 213 and 221 may perform a scene analysis of an image based on the current frame acquired through the camera module 211, and may select, as recipe information, one or more of a plurality of pieces of recipe information based on the analyzed scene.

In an operation of analyzing the scene of the image based on the frames acquired by the one or more processors 213 and 221, the one or more processors 213 and 221 may analyze the depth of the image, etc., segment at least one image region by using the analyzed depth, and calculate segmentation information for each region. The one or more processors 213 and 221 may calculate entire scene characteristics and brightness information for each region (e.g., ISO information and illumination information) by using the calculated segmentation information.

The one or more processors 213 and 221 may determine a parameter value for each region of the segmented image by using the calculated brightness information and scene characteristics.

The one or more processors 213 and 221 may select recipe information corresponding to the calculated brightness information, scene characteristics, and a parameter value for each region from among a plurality of pieces of recipe information stored in the memory 219.

The one or more processors 213 and 221 or the ISP 215 may process the image by using recipe information selected in response to the calculated brightness information, scene characteristics, and a parameter value for each region.

If it is determined that there is no change in the current screen or scene acquired through the camera module 221, the process of the electronic device 210 may branch from operation 531 to operation 535.

If it is determined that there is no change in the current screen or scene acquired through the camera module 211, the electronic device 210 may select the recipe information of the previous frame under the control of one or more processors 213 and 221, in operation 535. The recipe information of the previous frame may be recipe information, which is received at a time close to a time when the current screen or scene is acquired through the camera module 211, from among pieces of recipe information received from the cloud platform 250.

The recipe information selected in operation 535 is the recipe information calculated and generated by the electronic device 210, and the recipe information received in operation 507 and the recipe information selected in operation 535 are the recipe information calculated and generated by the cloud platform 250. The recipe information received in operation 507 may be recipe information received by the electronic device 210 from the cloud platform 250 in real time or according to a frame generation period, and the recipe information selected in operation 535 may be recipe information received by the electronic device 210 from the cloud platform 250 at the previous time or the previous frame.

Figure 6:
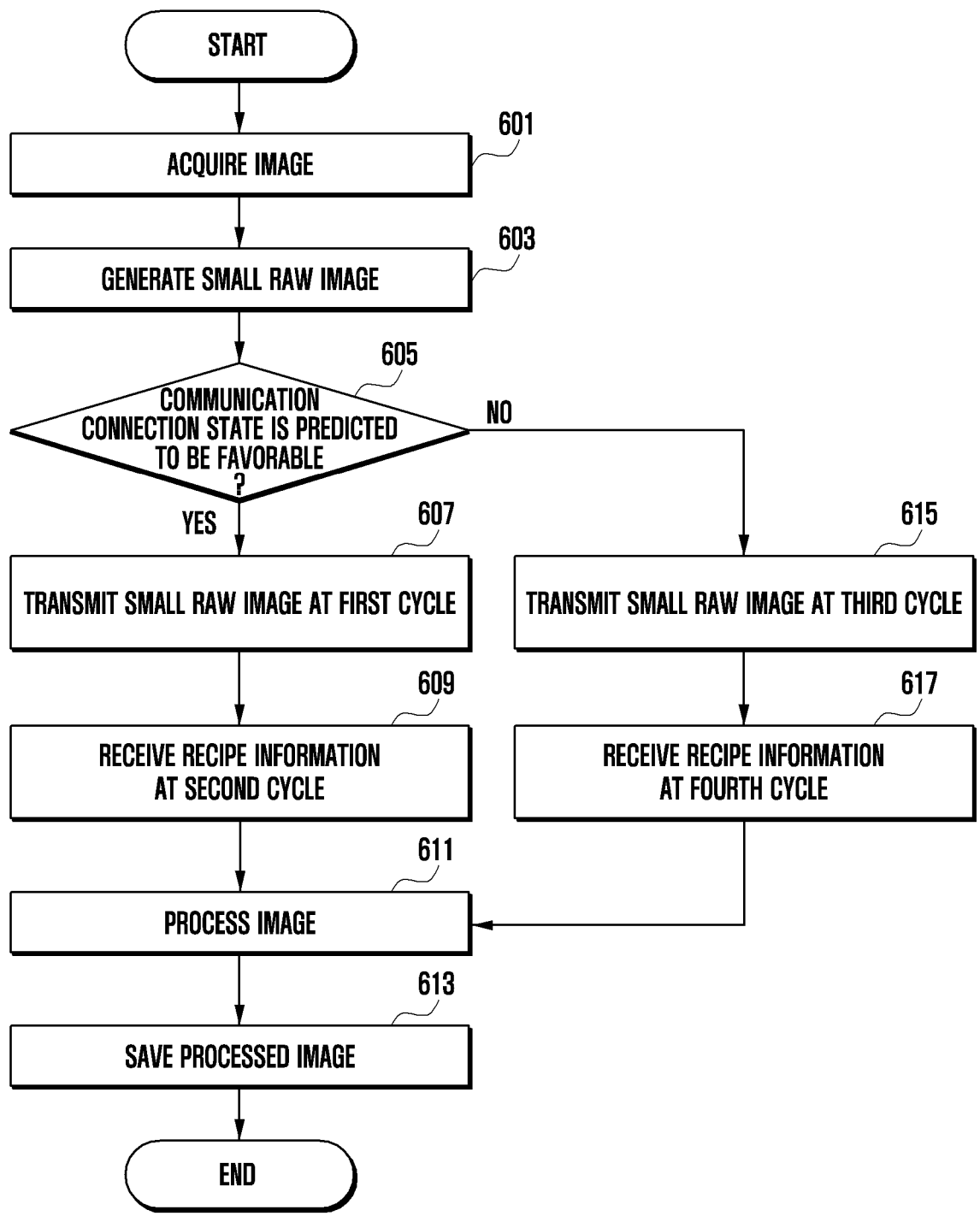
FIG. 6 is a flowchart illustrating an image processing method according to a network state according to various embodiments of the disclosure.

FIG. 6 is a flowchart illustrating an image processing method according to a network state according to various embodiments of the disclosure.

The electronic device 210 may acquire an image by using the camera module 211 according to a user input under the control of one or more processors 213 and 221 in operation 601.

When the camera function is executed, the electronic device 210 may acquire an image by using the camera module 211 according to a user input. At least one object may be included in the image acquired through the camera module 211.

In operation 603, the electronic device 210 may generate a small raw image (e.g., the small raw image 321 in FIG. 3) by using the acquired image under the control of one or more processors 213 and 221.

The electronic device 210 may generate a small raw image by down-scaling (for example, an operation of reducing the size or lowering the resolution) or down-sampling (for example, an operation of taking one or a part of a sampled series of samples) the acquired image (for example, the raw image). In addition, the electronic device 210 may compress the acquired image or the small raw image by using various image compression algorithms.

In various embodiments, the electronic device 210 may generate a small raw image by down-scaling (for example, an operation of reducing the size or lowering the resolution) or down-sampling (for example, an operation of taking one or a part of a sampled series of samples) the acquired image (for example, the raw image) by using the small raw image generator 217. In addition, the raw image compressor 218 of the electronic device 210 may compress the acquired image or the small raw image by using various image compression algorithms.

In operation 605, the electronic device 210 may predict a communication connection state and predict whether the communication connection is favorable under the control of one or more processors 213 and 221.

In operation 605, the operation of predicting, by the electronic device 210, whether or not the communication connection with the cloud platform 250 is favorable under the control of one or more processors 213 and 221 may be an operation of determining whether or not a desired raw image can be transmitted in the current environment, and the operation of determining whether or not the desired raw image can be transmitted in the current environment may be an operation of determining whether a communication throughput is at a specified level (e.g., a connection state of more than 50 Mbps upload).

For example, if the communication network is in a state of being connected to a 3G environment or is in a state of being connected at a limited speed in a 4G or 5G environment, transmission of a small raw image to the cloud platform 250 is quite limited, and thus raw image transmission is determined to be currently impossible although the communication is connected.

If the communication connection is predicted to be favorable, the process may branch from operation 605 to operation 607. If the communication connection is predicted to be poor, the process may branch from operation 605 to operation 615.

In various embodiments, the operation of determining whether a state of communication connection with the cloud platform 250 is favorable, by the electronic device 210, in operation 605 is as follows.

For example, when information on the connection state of a communication channel currently being connected or to be connected is transmitted to one or more processors 213 and 221 by a connection manager that manages wireless connection, the one or more processors 213 and 221 may predict whether or not the state of communication with the cloud platform 250 is favorable by using the information on the connection state of the communication channel.

The information on the connection state of the communication channel may include at least one of pieces of information on a communication transmission/reception throughput, a communication signal strength, and a communication volume of another communication device in the base station.

In various embodiments, if the communication transmission/reception throughput is higher than the preset transmission/reception throughput based on the information on the connection state of the communication channel, the one or more processors 213 and 221 may predict that the state of communication with the cloud platform 250 is favorable, and if the communication transmission/reception throughput is lower than or equal to the preset transmission/reception throughput, the one or more processors 213 and 221 may predict that the state of communication with the cloud platform 250 is not favorable.

In various embodiments, based on the information on the connection state of the communication channel, if the communication signal strength is greater, and thus better, than the preset signal strength, one or more processors 213 and 221 may predict that the state of communication with the cloud platform 250 is favorable, and if the communication signal strength is smaller than or equal to the preset signal strength, the one or more processors 213 and 221 may predict that the state of communication with the cloud platform 250 is not favorable.

In various embodiments, based on the information on the connection state of the communication channel, if the communication volume of the other communication device is smaller than or equal to the preset communication volume, the one or more processors 213 and 221 may predict that the state of communication with the cloud platform 250 is favorable, and if the communication volume of the other communication device is equal to or greater than the preset communication volume, the one or more processors 213 and 221 may predict that the state of communication with the cloud platform 250 is not favorable.

If the state of communication with the cloud platform 250 is predicted to be favorable, the electronic device 210 may transmit a small raw image to a communication module (e.g., the communication module 190 of FIG. 1) at a first cycle under the control of one or more processors 213 and 221 in operation 607.

In operation 609, the electronic device 210 may receive recipe information from the cloud platform 250 through a communication module (e.g., the communication module 190 of FIG. 1) at a second cycle under the control of one or more processors 213 and 221. The first cycle and the second cycle may be the same.

In operation 611, the electronic device 210 may process an acquired image by using recipe information received at a second cycle or recipe information received at a fourth cycle under the control of one or more processors 213 and 221.

In various embodiments, when it is predicted that the state of communication with the cloud platform 250 is favorable, the electronic device 210 may process the acquired image by using the second received recipe information under the control of one or more processors 213 and 221 in operation 611.

The ISP 215 of the electronic device 210 may perform various image processing of the acquired image (e.g., raw image) by using the recipe information received at the second or fourth cycle. The electronic device 210 may receive recipe information from the cloud platform 250 and perform raw image processing based on the recipe information through the ISP 215.

Image processing may include image processing operations such as white balance, color adjustment, noise reduction, sharpening, and detail enhancement. These image processing operations may be performed for each image region based on recipe information.

In operation 613, the electronic device 210 may store the processed image in one or more memories 219, 222, and 254 under the control of one or more processors 213 and 221. In operation 613, the electronic device 210 may perform an encoding operation, such as JPEG, of the processed image and store the encoded image in one or more memories 219 and 222. Alternatively, if the processed image is transmitted to the cloud platform 250, the electronic device 210 may store the processed image in at least one memory (e.g., image storage 254) of the cloud platform 250 in operation 613.

If it is predicted that the state of communication with the cloud platform 250 is not favorable, the process may branch from operation 605 to operation 615.

If it is predicted that the state of communication with the cloud platform 250 is not favorable, the electronic device 210 may transmit a small raw image to the cloud platform 250 through a communication module (e.g., the communication module 190 of FIG. 1) at a third cycle, under the control of the one or more processors 213 and 221, in operation 615. The first cycle and the third cycle may be different from each other, and the third cycle may be shorter than the first cycle.

In various embodiments, if it is predicted that the state of communication with the cloud platform 250 is not favorable, the electronic device 210 may transmit the small raw image to the cloud platform 250 through a communication module (e.g., the communication module 190 of FIG. 1) through the cloud platform 250 at an earlier cycle than when the state of communication with a communication state is predicted to be favorable, under the control of one or more processors 213 and 221, in operation 615.

In operation 617, the electronic device 210 may receive recipe information from the cloud platform 250 through a communication module (e.g., the communication module 190 of FIG. 1) at a fourth cycle under the control of one or more processors 213 and 221. The third cycle and the fourth cycle may be the same.

In various embodiments, when it is predicted that the state of communication with the cloud platform 250 is not favorable, the electronic device 210 may receive recipe information from the cloud platform 250 at an earlier cycle than when the state of communication with the cloud platform 250 is predicted to be favorable, under the control of one or more processors 213 and 221, in operation 617.

In operation 611, the electronic device 210 may process an acquired image by using recipe information received at a second cycle or recipe information received at a fourth cycle under the control of one or more processors 213 and 221.

Figure 7:
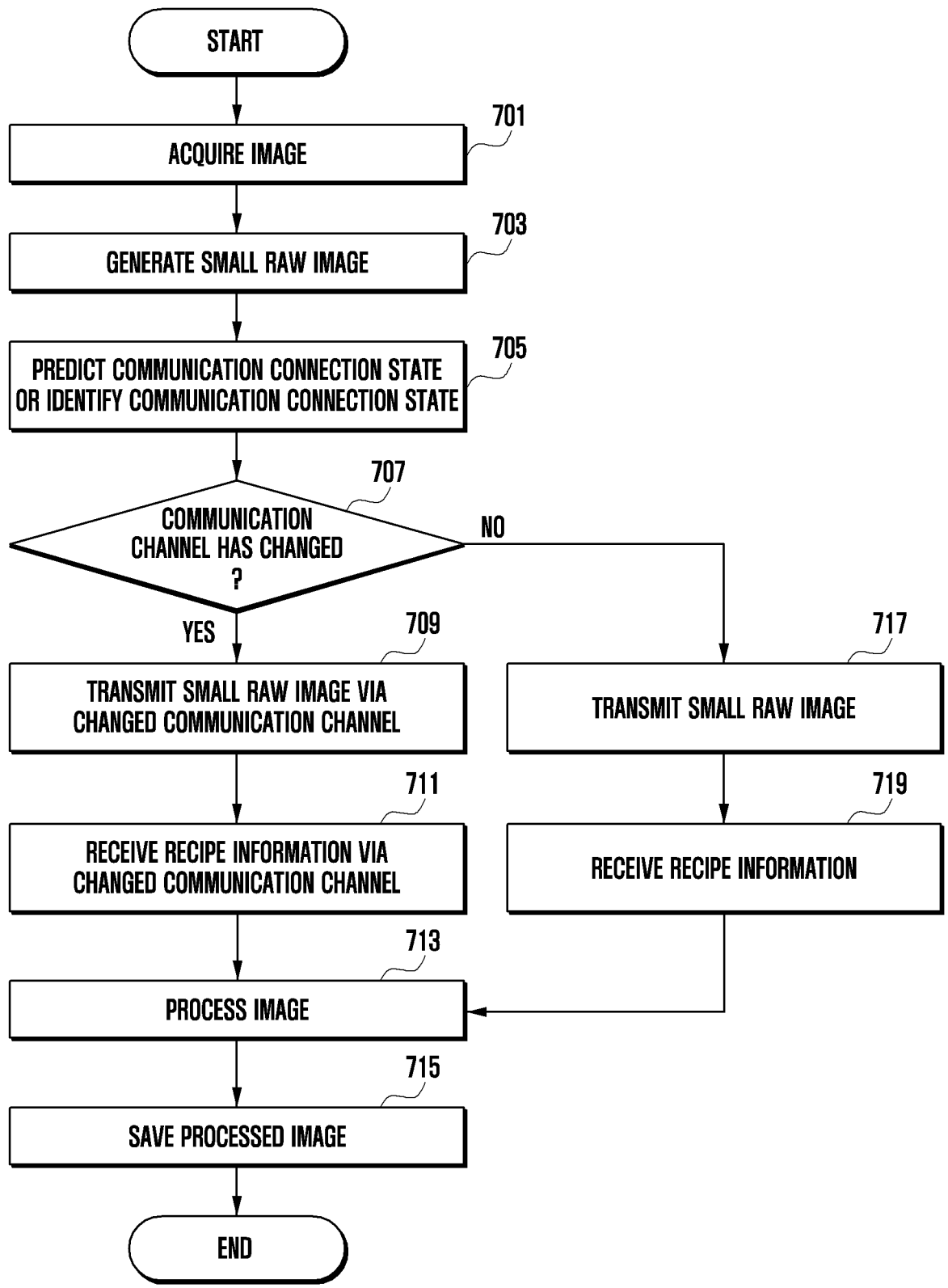
FIG. 7 is a flowchart illustrating an image processing method according to a network state according to various embodiments of the disclosure.

FIG. 7 is a flowchart illustrating an image processing method according to a network state according to various embodiments of the disclosure.

In operation 701, the electronic device 210 may acquire an image by using the camera module 211 according to a user input under the control of one or more processors 213 and 221.

When the camera function is executed, the electronic device 210 may acquire an image by using the camera module 211 according to a user input. At least one object may be included in the image acquired through the camera module 211.

In operation 703, the electronic device 210 may generate a small raw image (e.g., a small raw image 321 in FIG. 3) by using the acquired image under the control of one or more processors 213 and 221.

The electronic device 210 may generate a small raw image by down-scaling (for example, an operation of reducing the size or lowering the resolution) or down-sampling (for example, an operation of taking one or a part of a sampled series of samples) the acquired image (for example, raw image). In addition, the electronic device 210 may compress the acquired image or the small raw image by using various image compression algorithms.

In various embodiments, the electronic device 210 may generate a small raw image by down-scaling (for example, an operation of reducing the size or lowering the resolution) or down-sampling (for example, an operation of taking one or a part of a sampled series of samples) the acquired image (for example, the raw image) by using the small raw image generator 217. In addition, the raw image compressor 218 of the electronic device 210 may compress the acquired image or the small raw image by using various image compression algorithms.

In operation 705, the electronic device 210 may predict the communication connection state or identify the communication connection state under the control of the one or more processors 213 and 221.

In operation 705, the operation of predicting, by the electronic device 210, whether or not the communication connection with the cloud platform 250 is favorable under the control of one or more processors 213 and 221 may be an operation of determining whether or not a desired raw image can be transmitted in the current environment, and the operation of determining whether or not the desired raw image can be transmitted in the current environment may be an operation of determining whether a communication throughput is at a specified level (e.g., a connection state of more than 50 Mbps upload).

For example, if the communication network is in a state of being connected to a 3G environment or is in a state of being connected at a limited speed in a 4G or 5G environment, transmission of a small raw image to the cloud platform 250 is quite limited, and thus raw image transmission is determined to be currently impossible although the communication is connected.

In various embodiments, the operation of predicting, by the electronic device 210, whether a state of communication connection with the cloud platform 250 is favorable, under the control of one or more processors 213 and 221, in operation 705 is as follows.

For example, when information on the connection state of a communication channel currently being connected or to be connected is transmitted to one or more processors 213 and 221 by a connection manager that manages wireless connection, the one or more processors 213 and 221 may predict whether or not the state of communication with the cloud platform 250 is favorable by using the information on the connection state of the communication channel.

The information on the connection state of the communication channel may include at least one of pieces of information on a communication transmission/reception throughput, a communication signal strength, and a communication volume of another communication device in the base station.

In various embodiments, if the communication transmission/reception throughput is higher than the preset transmission/reception throughput based on the information on the connection state of the communication channel, the one or more processors 213 and 221 may predict that the state of communication with the cloud platform 250 is favorable, and if the communication transmission/reception throughput is lower than or equal to the preset transmission/reception throughput, the one or more processors 213 and 221 may predict that the state of communication with the cloud platform 250 is not favorable.

In various embodiments, based on the information on the connection state of the communication channel, if the communication signal strength is greater, and thus better, than the preset signal strength, one or more processors 213 and 221 may predict that the state of communication with the cloud platform 250 is favorable, and if the communication signal strength is smaller than or equal to the preset signal strength, the one or more processors 213 and 221 may predict that the state of communication with the cloud platform 250 is not favorable.

In various embodiments, based on the information on the connection state of the communication channel, if the communication volume of the other communication device is smaller than or equal to the preset communication volume, the one or more processors 213 and 221 may predict that the state of communication with the cloud platform 250 is favorable, and if the communication volume of the other communication device is equal to or greater than the preset communication volume, the one or more processors 213 and 221 may predict that the state of communication with the cloud platform 250 is not favorable.

In various embodiments, the operation of determining, by the electronic device 210, whether a state of communication connection with the cloud platform 250 is favorable, under the control of one or more processors 213 and 221, in operation 705 is as follows.

For example, when information on the connection state of a communication channel currently being connected or to be connected is transmitted to one or more processors 213 and 221 by a connection manager that manages wireless connection, the one or more processors 213 and 221 may identify whether or not the state of communication with the cloud platform 250 is favorable by using the information on the connection state of the communication channel.

The information on the connection state of the communication channel may include at least one of pieces of information on a communication transmission/reception throughput, a communication signal strength, and a communication volume of another communication device in the base station.

In various embodiments, if the communication transmission/reception throughput is higher than the preset transmission/reception throughput based on the information on the connection state of the communication channel, the one or more processors 213 and 221 may identify that the state of communication with the cloud platform 250 is favorable, and if the communication transmission/reception throughput is lower than or equal to the preset transmission/reception throughput, the one or more processors 213 and 221 may identify that the state of communication with the cloud platform 250 is not favorable.

In various embodiments, based on the information on the connection state of the communication channel, if the communication signal strength is greater, and thus better, than the preset signal strength, one or more processors 213 and 221 may identify that the state of communication with the cloud platform 250 is favorable, and if the communication signal strength is smaller than or equal to the preset signal strength, the one or more processors 213 and 221 may identify that the state of communication with the cloud platform 250 is not favorable.

In various embodiments, based on the information on the connection state of the communication channel, if the communication volume of the other communication device is smaller than or equal to the preset communication volume, the one or more processors 213 and 221 may identify that the state of communication with the cloud platform 250 is favorable, and if the communication volume of the other communication device is equal to or greater than the preset communication volume, the one or more processors 213 and 221 may identify that the state of communication with the cloud platform 250 is not favorable.

In various embodiments, in operation 707, the electronic device 210 may predict a communication connection state or determine whether to change a communication channel according to a result of identifying the communication connection state under the control of one or more processors 213 and 221.

In various embodiments, the electronic device 210 may change a communication channel if the communication connection state is predicted to be poor, or the communication connection state is determined to be poor as a result of identifying the communication connection state under the control of one or more processors 213 and 221, in operation 707. If the communication channel is changed, the process may branch from operation 707 to operation 709.

In various embodiments, the electronic device 210 may not change a communication channel if the communication connection state is predicted to be favorable, or the communication connection state is determined to be favorable as a result of identifying the communication connection state under the control of one or more processors 213 and 221, in operation 707. If the communication channel is not changed, the process may branch from operation 707 to operation 717.

When the communication channel is changed, the electronic device 210 may transmit the small raw image to the cloud platform 250 by using the changed communication channel through a communication module (e.g., the communication module 190 of FIG. 1) under the control of one or more processors 213 and 221, in operation 709. The changed communication channel may be a first communication channel, and may be a Wi-Fi or WLAN communication channel.

When the communication channel is changed, the electronic device 210 may receive recipe information from the cloud platform 250 by using the changed communication channel through a communication module (e.g., the communication module 190 of FIG. 1) under the control of one or more processors 213 and 221, in operation 711.

If the communication channel is not changed, the electronic device 210 may transmit the small raw image to the cloud platform 250 by using the original communication channel to through a communication module (e.g., the communication module 190 of FIG. 1) under the control of one or more processors 213 and 221, in operation 717. The original communication channel may be a second communication channel, and may be an LTE channel or a WWAN communication channel.

If the communication channel is not changed, the electronic device 210 may receive recipe information from the cloud platform 250 by using the original communication channel through a communication module (e.g., the communication module 190 of FIG. 1) under the control of one or more processors 213 and 221, in operation 719.

In operation 713, the electronic device 210 may process the acquired image by using the recipe information, which is received through the changed communication channel (e.g., the first communication channel (Wi-Fi communication channel or WLAN communication channel)), or the recipe information received through the original communication channel (e.g., the second communication channel (LTE communication channel or WWAN communication channel)) under the control of one or more processors 213 and 221.

The ISP 215 of the electronic device 210 performs various image processing of the acquired image (e.g., raw image) by using the received recipe information. The electronic device 210 may receive recipe information from the cloud platform 250 and perform raw image processing based on the recipe information through the ISP 215.

Image processing may include image processing operations such as white balance, color adjustment, noise reduction, sharpening, and detail enhancement. These image processing operations may be performed for each image region based on the recipe information.

In operation 715, the electronic device 210 may store the processed image in the one or more memories 219, 222, and 254 under the control of one or more processors 213 and 221. In operation 715, the processed image is subjected to an encoding operation such as JPEG, and then the electronic device 210 may store the processed image in one or more memories 219 and 222 of the electronic device 210. Alternatively, if the electronic device 210 transmits the processed image to the cloud platform 250, the electronic device 210 may store the processed image in at least one memory (e.g., image storage 254) of the cloud platform 250 in operation 715.

Figure 8:
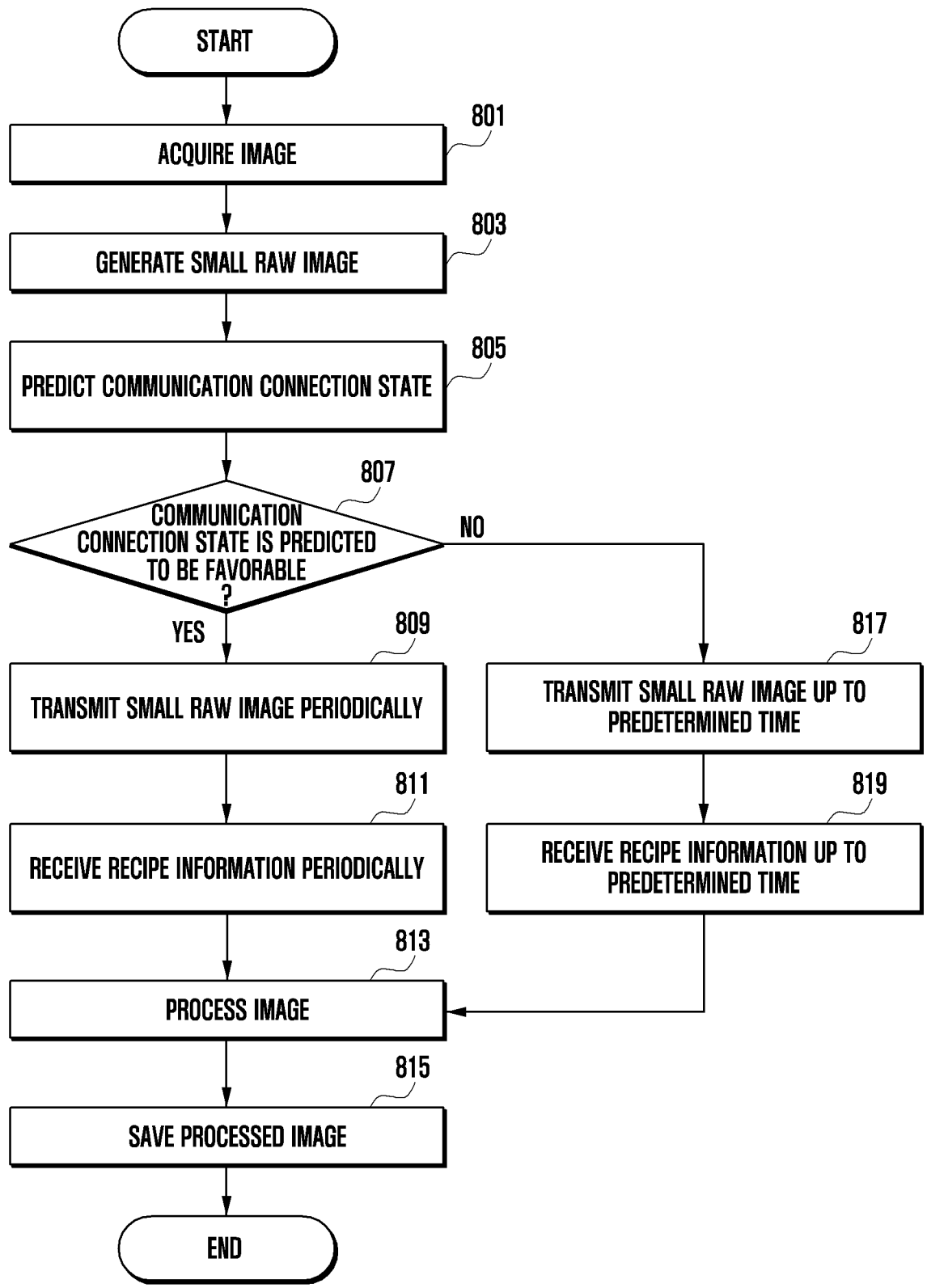
FIG. 8 is a flowchart illustrating an image processing method according to a network state according to various embodiments of the disclosure.

FIG. 8 is a flowchart illustrating an image processing method according to a network state according to various embodiments of the disclosure.

In operation 801, the electronic device 210 may acquire an image by using the camera module 211 according to a user input under the control of one or more processors 213 and 221.

When the camera function is executed, the electronic device 210 may acquire an image by using the camera module 211 according to a user input. At least one object may be included in the image acquired through the camera module 211.

In operation 803, the electronic device 210 may generate a small raw image (e.g., a small raw image 321 in FIG. 3) by using the acquired image under the control of one or more processors 213 and 221.

The electronic device 210 may generate a small raw image by down-scaling (for example, an operation of reducing the size or lowering the resolution) or down-sampling (for example, an operation of taking one or a part of a sampled series of samples) the acquired image (for example, raw image). In addition, the electronic device 210 may compress the acquired image or the small raw image by using various image compression algorithms.

In various embodiments, the electronic device 210 may generate a small raw image by down-scaling (for example, an operation of reducing the size or lowering the resolution) or down-sampling (for example, an operation of taking one or a part of a sampled series of samples) the acquired image (for example, the raw image) by using the small raw image generator 217. In addition, the raw image compressor 218 of the electronic device 210 may compress the acquired image or the small raw image by using various image compression algorithms.

In operation 805, the electronic device 210 may predict a communication connection state and predict whether the communication connection is favorable under the control of the one or more processors 213 and 221.

In operation 805, the operation of predicting, by the electronic device 210, whether or not the communication connection with the cloud platform 250 is favorable under the control of one or more processors 213 and 221 may be an operation of determining whether or not a desired raw image can be transmitted in the current environment, and the operation of determining whether or not the desired raw image can be transmitted in the current environment may be an operation of determining whether a communication throughput is at a specified level (e.g., a connection state of more than 50 Mbps upload).

For example, if the communication network is in a state of being connected to a 3G environment or is in a state of being connected at a limited speed in a 4G or 5G environment, transmission of a small raw image to the cloud platform 250 is quite limited, and thus raw image transmission is determined to be currently impossible although the communication is connected.

If the communication connection is predicted to be favorable, the process may branch from operation 805 to operation 807. If the communication connection is predicted to be poor, the process may branch from operation 805 to operation 815.

In various embodiments, the operation of predicting whether a state of communication connection with the cloud platform 250 is favorable, by the electronic device 210, in operation 805 is as follows.

For example, when information on the connection state of a communication channel currently being connected or to be connected is transmitted to one or more processors 213 and 221 by a connection manager that manages wireless connection, the one or more processors 213 and 221 may predict whether or not the state of communication with the cloud platform 250 is favorable by using the information on the connection state of the communication channel.

The information on the connection state of the communication channel may include at least one of pieces of information on a communication transmission/reception throughput, a communication signal strength, and a communication volume of another communication device in the base station.

In various embodiments, if the communication transmission/reception throughput is higher than the preset transmission/reception throughput based on the information on the connection state of the communication channel, the one or more processors 213 and 221 may predict that the state of communication with the cloud platform 250 is favorable, and if the communication transmission/reception throughput is lower than or equal to the preset transmission/reception throughput, the one or more processors 213 and 221 may predict that the state of communication with the cloud platform 250 is not favorable.

In various embodiments, based on the information on the connection state of the communication channel, if the communication signal strength is greater, and thus better, than the preset signal strength, one or more processors 213 and 221 may predict that the state of communication with the cloud platform 250 is favorable, and if the communication signal strength is smaller than or equal to the preset signal strength, the one or more processors 213 and 221 may predict that the state of communication with the cloud platform 250 is not favorable.

In various embodiments, based on the information on the connection state of the communication channel, if the communication volume of the other communication device is smaller than or equal to the preset communication volume, the one or more processors 213 and 221 may predict that the state of communication with the cloud platform 250 is favorable, and if the communication volume of the other communication device is equal to or greater than the preset communication volume, the one or more processors 213 and 221 may predict that the state of communication with the cloud platform 250 is not favorable.

If it is predicted that the state of communication with the cloud platform 250 is favorable, the electronic device 210 may periodically transmit the small raw image to the cloud platform 250 through a communication module (e.g., the communication module 190 of FIG. 1) under the control of one or more processors 213 and 221, in operation 807.

If it is predicted that the state of communication with the cloud platform 250 is favorable, the electronic device 210 may periodically receive recipe information from the cloud platform 250 through a communication module (for example, the communication module 190 of FIG. 1) under the control of one or more processors 213 and 221, in operation 809.

If it is predicted that the state of communication with the cloud platform 250 is not favorable, the process may branch from operation 805 to operation 815.

If it is predicted that the state of communication with the cloud platform 250 is not favorable, the electronic device 210 may transmit the small raw image to the cloud platform 250 through a communication module (e.g., the communication module 190 of FIG. 1) until a predetermined time under the control of one or more processors 213 and 221 in operation 815. The predetermined time may be a time point at which the communication state is predicted to deteriorate.

If it is predicted that the state of communication with the cloud platform 250 is not favorable, the electronic device 210 may receive recipe information from the cloud platform 250 through a communication module (e.g., the communication module 190 of FIG. 1) until a predetermined time under the control of one or more processors 213 and 221, in operation 817. The predetermined time may be a time point at which the communication state is predicted to deteriorate.

In operation 811, the electronic device 210 may process the acquired image by using periodically received recipe information or recipe information received until a predetermined time under the control of one or more processors 213 and 221.

In various embodiments, if it is predicted that the state of communication with the cloud platform 250 is favorable, the electronic device 210 may process the acquired image by using the periodically received recipe information under the control of one or more processors 213 and 221, in operation 811.

The ISP 215 of the electronic device 210 performs various image processing of the acquired image (e.g., raw image) by using recipe information received periodically or until a predetermined time. The electronic device 210 may receive recipe information from the cloud platform 250 and perform raw image processing based on the recipe information through the ISP 215.

Image processing may include image processing operations such as white balance, color adjustment, noise reduction, sharpening, and detail enhancement. These image processing operations may be performed for each image region based on the recipe information.

In operation 813, the electronic device 210 may store the processed image in the one or more memories 219, 222, and 254 under the control of one or more processors 213 and 221. In operation 813, the processed image is subjected to an encoding operation such as JPEG, and then the electronic device 210 may store the processed image in one or more memories 219 and 222 of the electronic device 210. Alternatively, if the electronic device 210 transmits the processed image to the cloud platform 250, the electronic device 210 may store the processed image in at least one memory (e.g., image storage 254) of the cloud platform 250 in operation 813.

Figure 9:
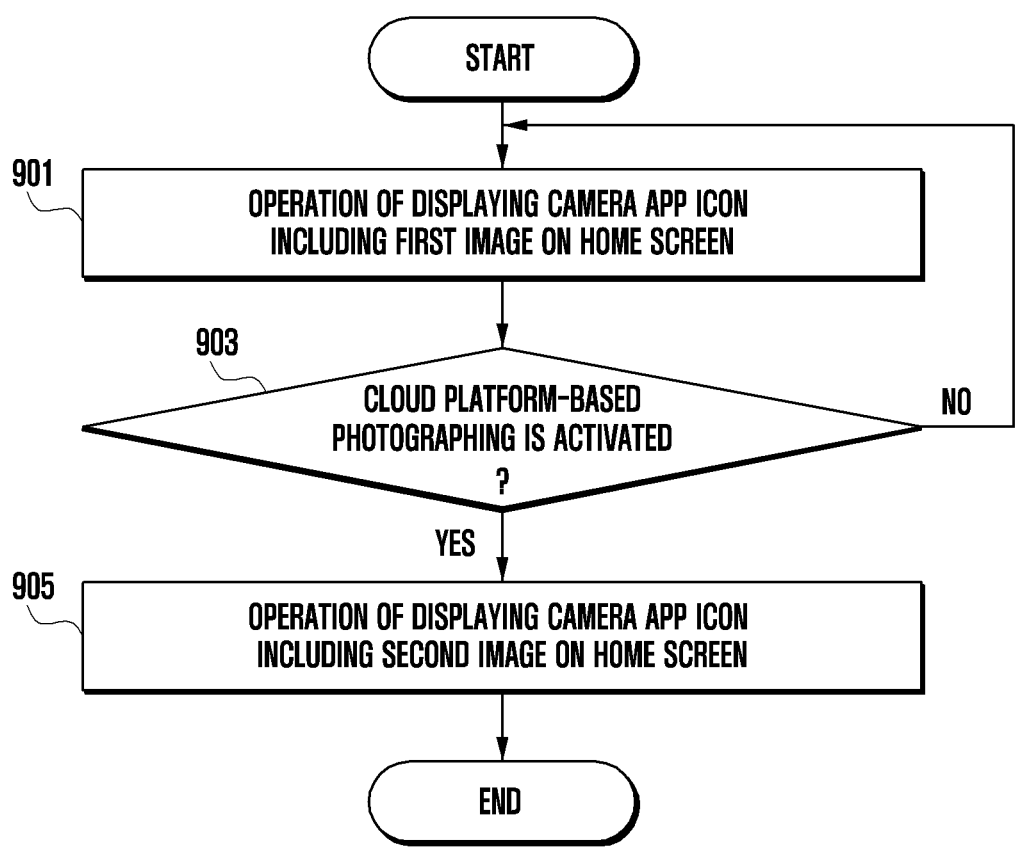
FIG. 9 is a flowchart illustrating an operation of displaying a camera APP icon according to various embodiments of the disclosure.

FIG. 9 is a flowchart illustrating an operation of displaying a camera APP icon according to various embodiments of the disclosure.

In operation 901, the electronic device 210 may display a camera app icon including a first image on a home screen under the control of one or more processors 213 and 221.

In various embodiments, in operation 901, the electronic device 210 may control a display 220 to display the camera app icon including the first image on a home screen under the control of one or more processors 213 and 221. For example, the first image may include an image related to a camera.

In operation 903, the electronic device 210 may determine whether photographing based on the cloud platform 250 is activated, under the control of one or more processors 213 and 221.

In various embodiments, in operation 903, the operation of activating photographing based on the cloud platform 250 by the electronic device 210 under the control of one or more processors 213 and 221 may be an operation of activating the photographing based on the cloud platform 250 according to a user input, for example.

In various embodiments, in operation 903, the operation of activating photographing based on the cloud platform 250 by the electronic device 210 under the control of one or more processors 213 and 221 may be an operation of automatically activating the photographing according to the state of communication with the cloud platform 250.

In operation 903, if it is determined that photographing based on the cloud platform 250 is not activated, under the control of one or more processors 213 and 221, the process of the electronic device 210 may branch to operation 901.

In various embodiments, in operation 903, if it is determined that photographing based on the cloud platform 250 is deactivated, under the control of one or more processors 213 and 221, the process of the electronic device 210 may branch to operation 901.

In operation 903, if it is determined that photographing based on the cloud platform 250 is activated, under the control of one or more processors 213 and 221, the process of the electronic device 210 may branch to operation 905.

If it is determined that photographing based on the cloud platform 250 is activated, the electronic device 210 may display the camera app icon including a second image on a home screen under the control of one or more processors 213 and 221, in operation 905.

In various embodiments, if it is determined that photographing based on the cloud platform 250 is activated, the electronic device 210 may control the display 220 to display the camera app icon including the second image on the home screen under the control of one or more processors 213 and 221, in operation 905. The second image includes the first image, and may further include an image indicating that photographing based on the cloud platform 250 is activated. In order to further include the image indicating that photographing based on the cloud platform 250 is activated, the second image may include an image related to a cloud and an image related to a communication antenna.

Figure 10:
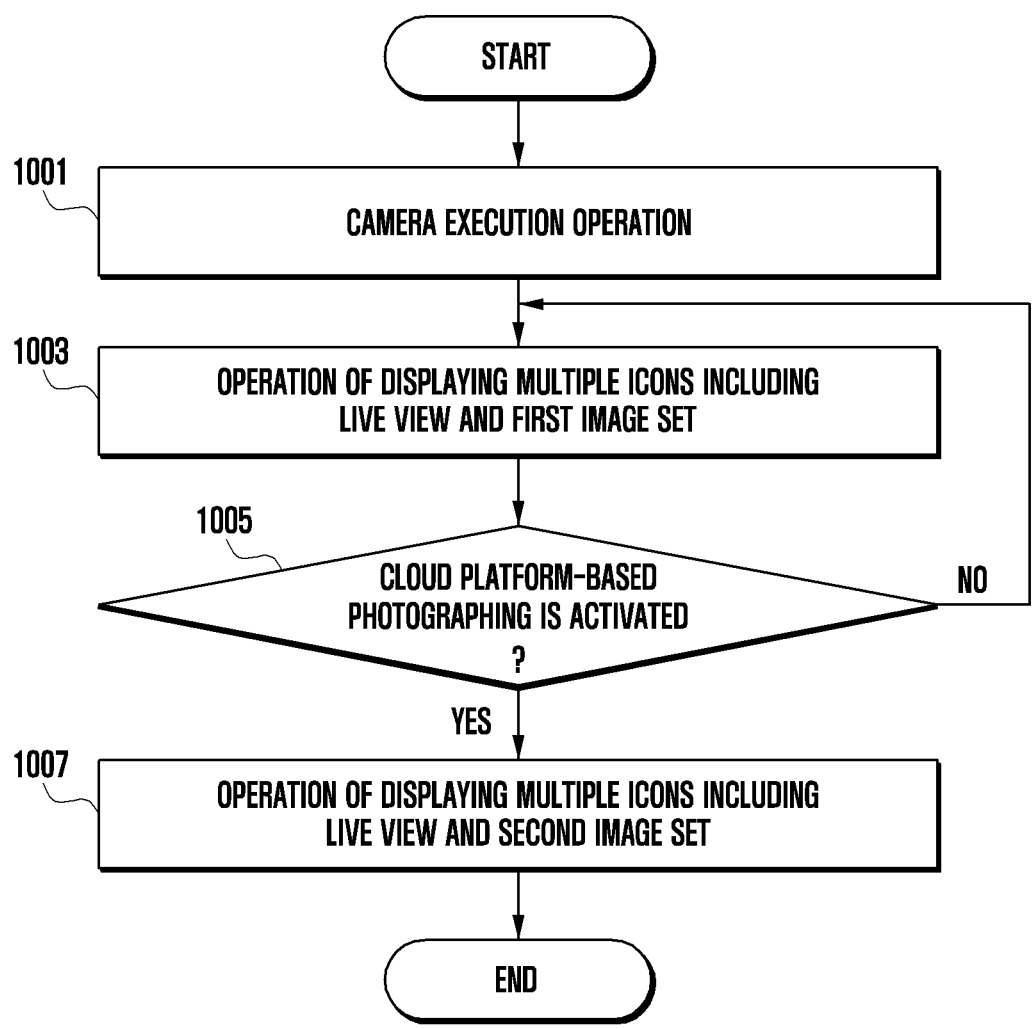
FIG. 10 is a flowchart illustrating a camera live view display operation according to various embodiments of the disclosure.

FIG. 10 is a flowchart illustrating a camera live view display operation according to various embodiments of the disclosure.

The electronic device 210 may execute a camera function under the control of one or more processors 213 and 221 in operation 1001.

In various embodiments, in operation 1001, the electronic device 210 may execute a camera function according to a user input under the control of one or more processors 213 and 221.

In various embodiments, in operation 1001, the electronic device 210 may execute a camera function when receiving a user input for a camera app icon displayed on the home screen under the control of one or more processors 213 and 221.

In operation 1003, when the camera function is executed, the electronic device 210 may display a plurality of camera icons including a live view and a first image set on the display 220 under the control of one or more processors 213 and 221.

In various embodiments, in operation 1003, the operation of displaying, on the display 220, the plurality of camera icons including the live view and the first image set, by the electronic device 210, under the control of one or more processors 213 and 221 may be an operation of overlaying and displaying the plurality of camera icons including the first image set on the live view, or translucently or transparently displaying the plurality of camera icons.

The first image set may include at least one of a photographing button, a thumbnail image relating to previous photographing results, or quick view images for the thumbnail image relating to previous photographing results. The live view may be a background screen currently being photographed through the camera module 211.

In operation 1005, the electronic device 210 may determine whether photographing based on the cloud platform 250 is activated, under the control of one or more processors 213 and 221.

In various embodiments, in operation 1005, the operation of activating the photographing based on the cloud platform 250, by the electronic device 210, under the control of one or more processors 213 and 221 may be an operation of activating the photographing based on cloud platform 250 according to a user input, for example.

In various embodiments, in operation 1005, the operation of activating the photographing based on the cloud platform 250, by the electronic device 210, under the control of one or more processors 213 and 221 may be an operation of automatically activating the photographing according to the state of communication with the communication platform 250.

In operation 1005, if it is determined that the photographing based on the cloud platform 250 is not activated, under the control of one or more processors 213 and 221, the process of the electronic device 210 may branch to operation 1003.

In various embodiments, in operation 1005, if it is determined that the photographing based on the cloud platform 250 is deactivated, under the control of one or more processors 213 and 221, the process of the electronic device 210 may branch to operation 1003.

In operation 1005, if it is determined that the photographing based on the cloud platform 250 is activated, under the control of one or more processors 213 and 221, the process of the electronic device 210 may branch to operation 1007.

If it is determined that the photographing based on the cloud platform 250 is activated, the operation of displaying a plurality of camera icons including a live view and a second image set on the display 220, by the electronic device 210, under the control of one or more processors 213 and 221 may be an operation of overlaying and displaying the plurality of camera icons including the second image set on the live view, or translucently or transparently displaying the plurality camera icons, in operation 1007. The live view displayed in operation 1007 may reflect recipe information received from the cloud platform 250.

The second image set may include at least one of a photographing button, a thumbnail image relating to previous photographing results, a quick view image for the thumbnail image relating to previous photographing results, and an image relating to a communication state. The live view may be a background screen currently being photographed through the camera module 211. The second image set, which includes a photographing button, a thumbnail image relating to previous photographing results, a quick view image relating to previous photographing results, or an image relating to a communication state, may further include an image indicating that photographing based on the cloud platform 250 is activated. In order to further include the image indicating that photographing based on the cloud platform 250 is activated, the second image set may include an image related to a cloud and an image related to a communication antenna.

Figure 11:
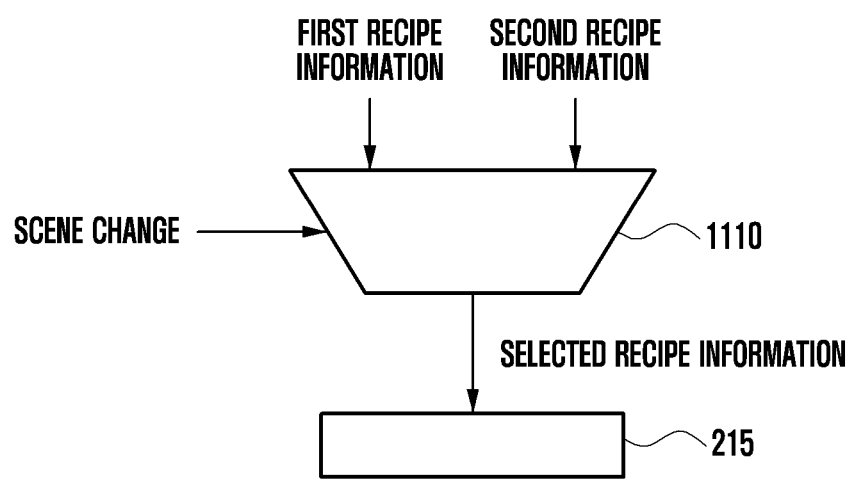
FIG. 11 is a block diagram illustrating a recipe information selection operation according to various embodiments of the disclosure.

FIG. 11 is a block diagram illustrating a recipe information selection operation according to various embodiments of the disclosure.

First recipe information may be recipe information received from the cloud platform 250, and second recipe information may be recipe information selected from the electronic device 210.

A recipe information selector 1110 may be one or more processors 213 and 221.

The recipe information selector 1110 may select first recipe information or second recipe information based on a scene change and transmit the selected recipe information to the ISP 215. The ISP 215 may process an image according to the selected recipe information.

Figure 12:
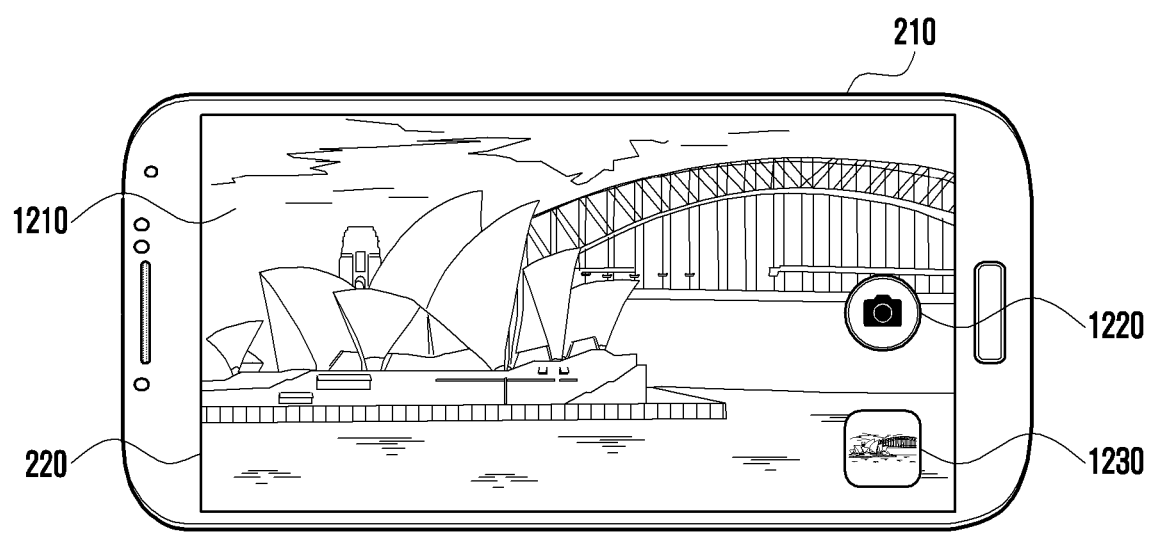
FIG. 12 illustrates a camera live view display operation when it is determined that photographing based on the cloud platform of FIG. 10 is deactivated according to various embodiments of the disclosure.

FIG. 12 illustrates a camera live view display operation when it is determined that photographing based on the cloud platform 250 of FIG. 10 is deactivated according to various embodiments of the disclosure.

When the camera function is executed, the electronic device 210 may display, on the display 220, a plurality of camera icons 1220 and 1230 including a live view 1210 and a first image set under the control of one or more processors 213 and 221.

In various embodiments, the operation of displaying, on the display 220, the plurality of camera icons 1220 and 1230 including the live view 1210 and the first image set, by the electronic device 210, under the control of one or more processors 213 and 221 may be an operation of overlaying and displaying the plurality of camera icons 1220 and 1230 including the first image set on the live view 1210, or translucently or transparently displaying the plurality of camera icons.

The first image set may include at least one of a photographing button 1220, a thumbnail image 1230 relating to previous photographing results, or a quick view images 1230 relating to previous photographing results. The live view 1210 may be a background screen currently being photographed through the camera module 211.

Figure 13:
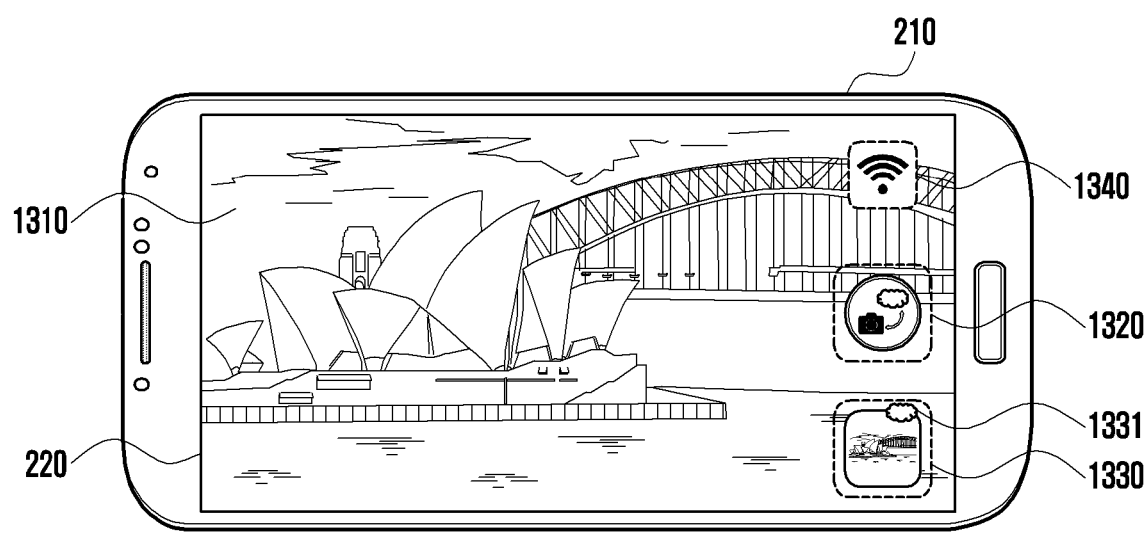
FIG. 13 illustrates a camera live view display operation when it is determined that photographing based on the cloud platform of FIG. 10 is activated according to various embodiments of the disclosure.

FIG. 13 illustrates a camera live view display operation when it is determined that photographing based on the cloud platform 250 of FIG. 10 is activated according to various embodiments of the disclosure.

When the camera function is executed, the electronic device 210 may display, on the display 220, a plurality of camera icons 1320, 1330, and 1340 including a live view 1310 and a second image set under the control of one or more processors 213 and 221.

In various embodiments, the operation of displaying a plurality of camera icons 1320, 1330, and 1340 including a live view 1310 and a second image set on the display 220, by the electronic device 210, under the control of one or more processors 213 and 221 may be an operation of overlaying and displaying the plurality of camera icons 1320, 1330, and 1340 including the second image set on the live view 1310, or translucently or transparently displaying the plurality camera icons.

The second image set may include at least one of a photographing button 1320, a thumbnail image 1230 relating to previous photographing results, a quick view image 1230 for the thumbnail image relating to previous photographing results, and an image 1340 relating to a communication state. The live view 1310 may reflect recipe information received from the cloud platform 250. The live view 1310 may be a background screen currently being photographed through the camera module 211. The second image set, which includes the photographing button 1320, the thumbnail image 1330 relating to previous photographing results, the quick view image 1330 relating to previous photographing results, or the image 1340 relating to a communication state, may further include an image indicating that photographing based on the cloud platform 250 is activated. In order to further include the image indicating that photographing based on the cloud platform 250 is activated, the second image set may include an image related to a cloud (for example, indicated by reference numeral 1331) and the image 1340 relating to a communication antenna.

Figure 14:
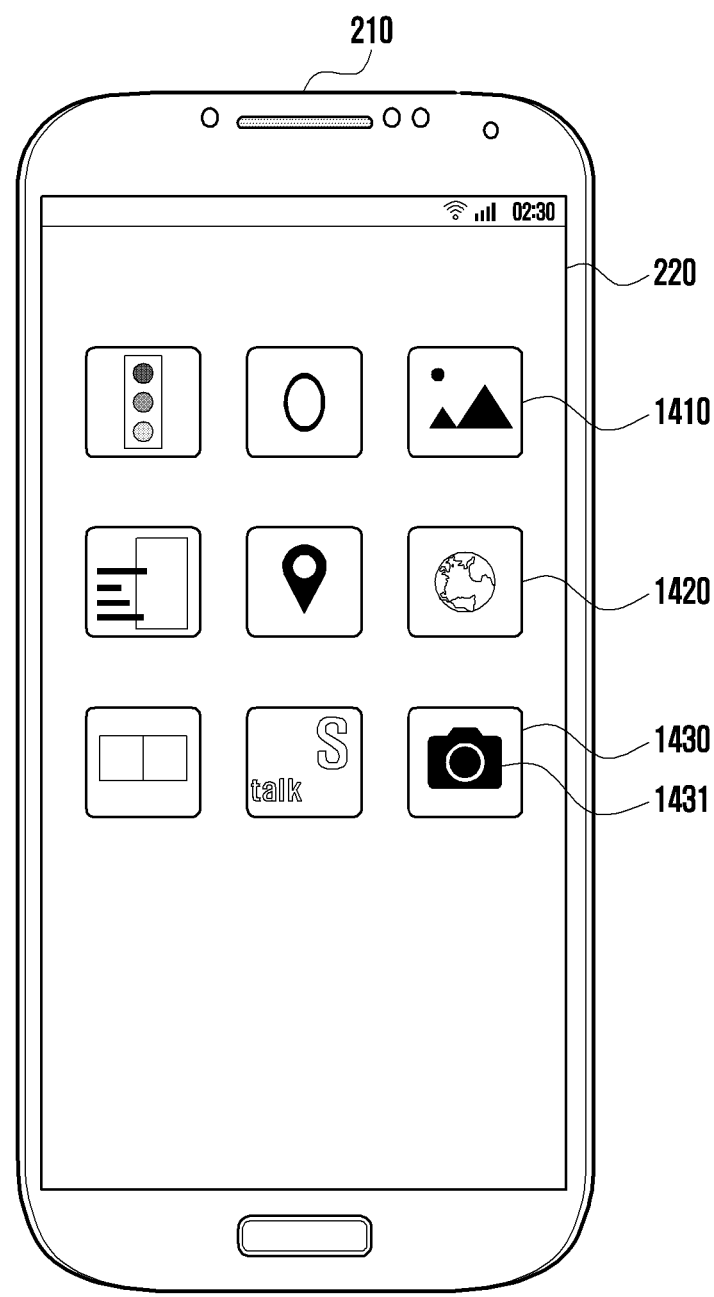
FIG. 14 illustrates an operation of displaying a camera app icon when it is determined that photographing based on the cloud platform of FIG. 9 is deactivated according to various embodiments of the disclosure.

FIG. 14 illustrates an operation of displaying a camera app icon when it is determined that photographing based on the cloud platform 250 of FIG. 9 is deactivated according to various embodiments of the disclosure.

The electronic device 210 may display a home screen on the display 220 and display one or more app icons 1410, 1420, and 1430 on the home screen under the control of one or more processors 213 and 221.

The electronic device 210 may display a camera app icon 1430 including a first image 1431 on a home screen under the control of one or more processors 213 and 221.

In various embodiments, the electronic device 210 may control the display 220 to display the camera app icon 1410 including the first image 1431 on a home screen under the control of one or more processors 213 and 221. For example, the first image 1431 may include an image related to a camera.

Figure 15:
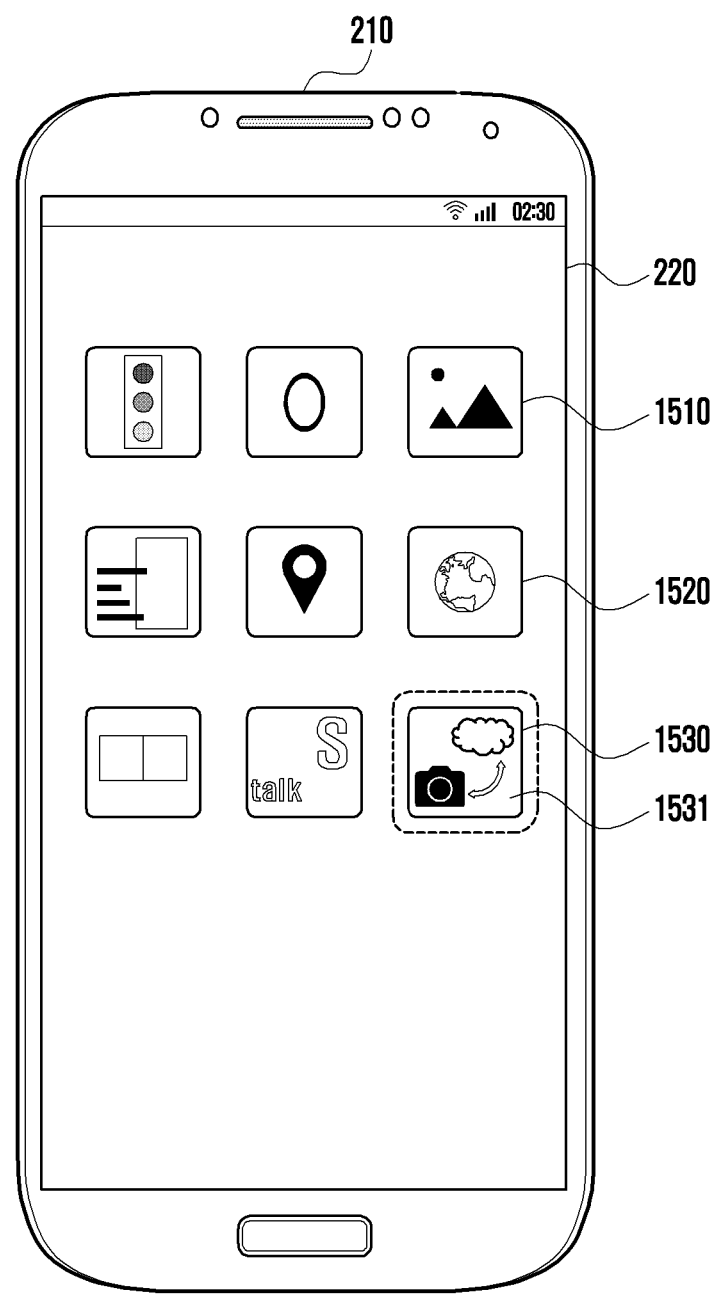
FIG. 15 illustrates an operation of displaying a camera app icon when it is determined that photographing based on the cloud platform of FIG. 9 is activated according to various embodiments of the disclosure.

FIG. 15 illustrates an operation of displaying a camera app icon when it is determined that photographing based on the cloud platform 250 of FIG. 9 is activated according to various embodiments of the disclosure.

The electronic device 210 may display a home screen on the display 220 and display one or more app icon 1510, 1520, and 1530 on the home screen under the control of one or more processors 213 and 221. The one or more app icons 1510, 1520, and 1530 on the home screen of FIG. 15 may be icons relating to functions such as one or more app icons 1410, 1420, and 1430 on the home screen of FIG. 14.

If it is determined that photographing based on the cloud platform 250 is activated, under the control of one or more processors 213 and 221, the electronic device 210 may display the camera app icon 1530 including a second image 1531 on the home screen.

In various embodiments, if it is determined that photographing based on the cloud platform 250 is activated, the electronic device 210 may control the display 220 to display the camera app icon 1530 including the second image 1531 on the home screen under the control of the one or more processors 213 and 221. The second image 1531 may include the first image 1431 of FIG. 14, and may further include an image indicating that photographing based on the cloud platform 250 is activated. In order to further include the image indicating that photographing based on the cloud platform 250 is activated, the second image may include an image related to a cloud and an image related to a communication antenna.

Figure 16:
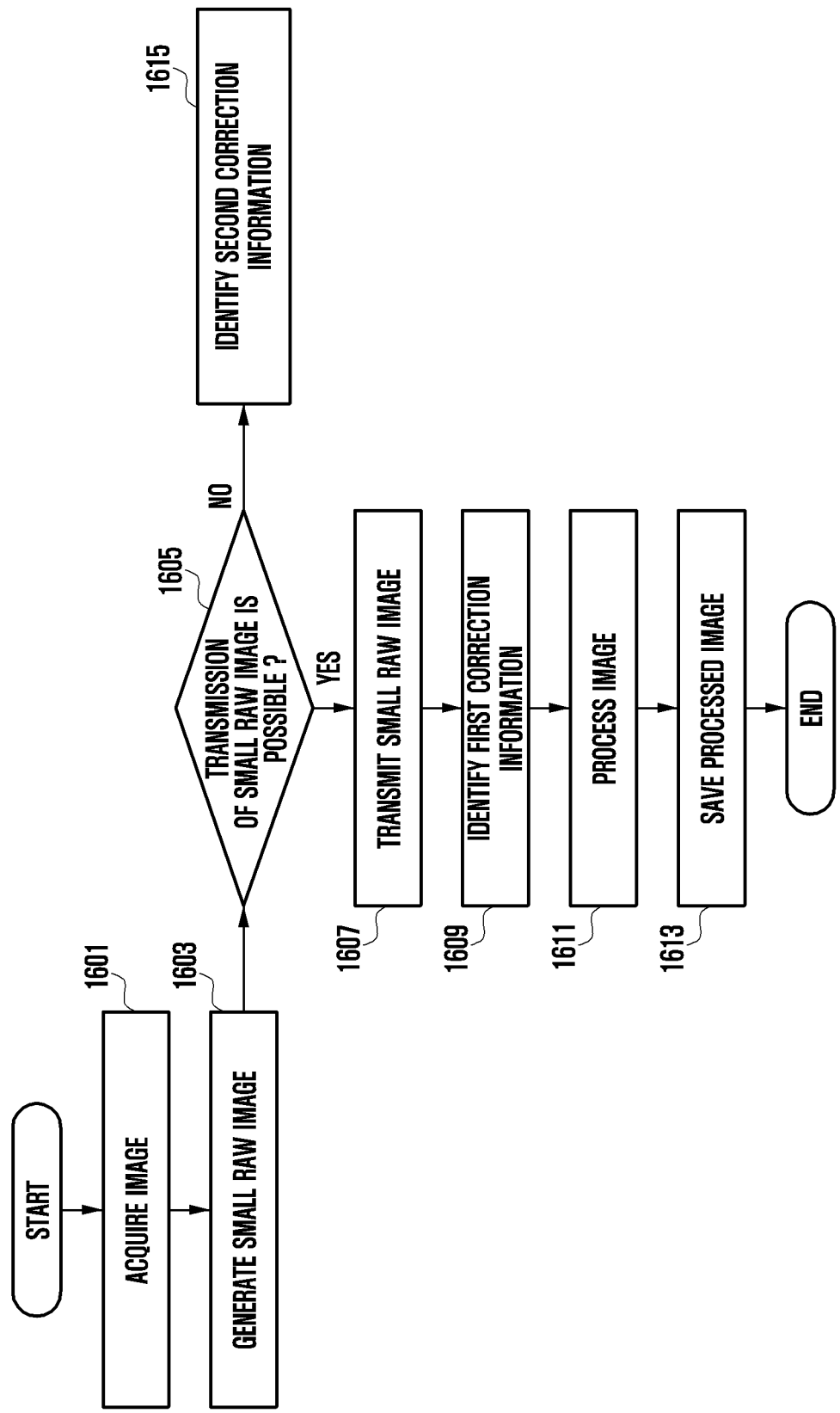
FIG. 16 is a flowchart illustrating an image processing method according to a network state according to various embodiments of the disclosure.

FIG. 16 is a flowchart illustrating an image processing method according to a network state according to various embodiments of the disclosure.

In operation 1601, the electronic device 210 may acquire an image of an external object by using the camera module 211 according to a user input under the control of one or more processors 213 and 221.

When the camera function is executed, the electronic device 210 may acquire an image by using the camera module 211 according to a user input. At least one object may be included in the image acquired through the camera module 211.

In operation 1603, the electronic device 210 may generate a small raw image (e.g., a small raw image 321 in FIG. 3) by using the acquired image under the control of one or more processors 213 and 221.

The electronic device 210 may generate a small raw image by down-scaling (for example, an operation of reducing the size or lowering the resolution) or down-sampling (for example, an operation of taking one or a part of a sampled series of samples) the acquired image (for example, a raw image). In addition, the electronic device 210 may compress the acquired image or the small raw image by using various image compression algorithms.

In various embodiments, the electronic device 210 may generate a small raw image by down-scaling (for example, an operation of reducing the size or lowering the resolution) or down-sampling (for example, an operation of taking one or a part of a sampled series of samples) the acquired image (for example, the raw image) by using the small raw image generator 217. In addition, the raw image compressor 218 of the electronic device 210 may compress the acquired image or the small raw image by using various image compression algorithms.

In operation 1605, the electronic device 210 may determine whether transmission of a small raw image to the cloud platform 250 through a communication module is possible under the control of one or more processors 213 and 221.

Operation 1605 may be an operation of determining, by the electronic device 210, whether or not the small raw image can be transmitted to the cloud platform 250 in the current environment under the control of one or more processors 213 and 221, and the operation of determining whether or not the desired raw image can be transmitted in the current environment may be an operation of determining whether a communication throughput is at a specified level (e.g., a connection state of more than 50 Mbps upload).

For example, if the communication network is in a state of being connected to a 3G environment or is in a state of being connected at a limited speed in a 4G or 5G environment, transmission of the small raw image to the cloud platform 250 is quite limited, and thus raw image transmission is determined to be currently impossible although the communication is connected.

In various embodiments, the operation of determining, by the electronic device 210, whether or not transmission of the small raw image is possible in operation 1605 is as follows.

For example, when information on the connection state of a communication channel currently being connected or to be connected is transmitted to one or more processors 213 and 221 by a connection manager that manages wireless connection, the one or more processors 213 and 221 may determine whether or not the state of communication with the cloud platform 250 is favorable by using the information on the connection state of the communication channel.

The information on the connection state of the communication channel may include at least one of pieces of information on a communication transmission/reception throughput, a communication signal strength, and a communication volume of another communication device in the base station.

In various embodiments, if the communication transmission/reception throughput is higher than the preset transmission/reception throughput based on the information on the connection state of the communication channel, the one or more processors 213 and 221 may determine that the state of communication with the cloud platform 250 is favorable. If the communication transmission/reception throughput is lower than or equal to the preset transmission/reception throughput, the one or more processors 213 and 221 may determine that the state of communication with the cloud platform 250 is not favorable.

In various embodiments, based on the information on the connection state of the communication channel, if the communication signal strength is greater, and thus better, than the preset signal strength, the one or more processors 213 and 221 may determine that the state of communication with the cloud platform 250 is favorable. If the communication signal strength is smaller than or equal to the preset signal strength, the one or more processors 213 and 221 may determine that the state of communication with the cloud platform 250 is not favorable.

In various embodiments, based on the information on the connection state of the communication channel, if the communication volume of the other communication device is smaller than or equal to the preset communication volume, the one or more processors 213 and 221 may determine that the state of communication with the cloud platform 250 is favorable. If the communication volume of the other communication device is equal to or greater than the preset communication volume, the one or more processors 213 and 221 may determine that the state of communication with the cloud platform 250 is not favorable.

Referring to FIG. 1, when describing the connection manager in detail, the program 140 may include an operating system that controls resources related to the electronic device 101 and/or various applications (e.g., application programs 146) running on the operating system. The operating system may include, for example, Android™, iOS™, Windows™, Symbian™, Tizen™, or Bada™.

Referring to FIG. 1, the program 140 may include an operating system 142, a kernel, middleware 144, an application programming interface (API), and/or an application program 146. The middleware 144 may provide, for example, a function commonly required by the application 146, or may provide various functions to the application 370 through an API so that the application 146 can use limited system resources inside the electronic device. The middleware 144 includes at least one of a runtime library, an application manager, a window manager, a multimedia manager, a resource manager, a power manager, a database manager, a package manager, a connection manager, a notification manager, a location manager, a graphic manager, or a security manager. The connection manager may manage communication connections, for example.

If it is determined that transmission of the small raw image is possible, the process of the electronic device 210 may branch from operation 1605 to operation 1607.

If it is determined that transmission of the small raw image to the cloud platform is possible, the electronic device 210 may transmit the small raw image to the cloud platform 250 through a communication module (e.g., the communication module 190 of FIG. 1) under the control of one or more processors 213 and 221, in operation 1607.

In operation 1609, the electronic device 210 may receive first correction information from the cloud platform 250 through a communication module (e.g., the communication module 190 of FIG. 1) under the control of one or more processors 213 and 221.

The first correction information may be the same as the recipe information of FIG. 2 or the correction region information 332 mentioned in FIG. 3. The cloud platform 250 may segment at least one image region in a small raw image (e.g., the small raw image 321 of FIG. 3). The cloud platform 250 may recognize each of at least one image region segmented according to a result of the segmentation. The cloud platform 250 may generate recipe information including at least one of pieces of information associated with a plurality of generated image regions, for example, coordinate information (vector information), segment information, layer information, a result of recognition, and scene category information of the image region, and may transmit the generated recipe information to the electronic device 210.

In operation 1611, the electronic device 210 may process the acquired image by using the first correction information or second correction information under the control of one or more processors 213 and 221.

In various embodiments, if it is determined that the state of communication with the cloud platform 250 is favorable, the electronic device 210 may process the acquired image by using the first information under the control of one or more processors 213 and 221 in operation 1611.

The ISP 215 of the electronic device 210 performs various image processing of the acquired image (e.g., raw image) by using the first correction information. The electronic device 210 may receive recipe information from the cloud platform 250 and perform raw image processing based on the recipe information through the ISP 215.

Image processing may include image processing operations such as white balance, color adjustment, noise reduction, sharpening, and detail enhancement. These image processing operations may be performed for each image region based on the recipe information.

In operation 1613, the electronic device 210 may store the processed image in the one or more memories 219, 222, and 254 under the control of one or more processors 213 and 221. In operation 1613, the processed image is subjected to an encoding operation such as JPEG, and the electronic device 210 may store the processed image in one or more memories 219 and 222 of the electronic device 210. Alternatively, if the electronic device 210 transmits the processed image to the cloud platform 250, the electronic device 210 may store the processed image in at least one memory (e.g., image storage 254) of the cloud platform 250 in operation 1613.

If it is determined that transmission of the small raw image is not possible, the process may branch from operation 1605 to operation 1615.

If it is determined that transmission of the small raw image is not possible, the electronic device 210 may identify the second correction information according to context information about the image under the control of one or more processors 213 and 221, in operation 1615.

In operation 1611, the electronic device 210 may process the acquired raw image by using the first correction information or the second correction information under the control of one or more processors 213 and 221.

In various embodiments, if it is determined that the state of communication with the cloud platform 250 is not favorable or that the communication state is poor, the electronic device 210 may process the acquired image based on the second correction information under the control of one or more processors 213 and 221 in operation 1611. The second correction information may be information generated according to context information, or may be recipe information prepared in advance.

In various embodiments, the ISP 215 of the electronic device 210 may perform various image processing of the acquired image (e.g., a raw image) by using the second correction information.

In various embodiments, the second correction information may be one of a plurality of pieces of recipe information preset in the electronic device 210 in consideration of various situations. The electronic device 210 may determine that, among a plurality of pieces of preset recipe information, at least one piece of recipe information corresponding similarly or identically to the current screen or scene acquired through the camera module 211 in terms of the object, brightness, color, and the like is second correction information.

In various embodiments, the second correction information may be first correction information, which is received at a time close to a time when the current screen or scene is acquired through the camera module 211, from among pieces of first correction information received from the cloud platform 250.

In various embodiments, if it is determined that transmission of the small raw image is not possible, the electronic device 210 may determine context information about the image in operation 1615. The context information about the image may be a change in the current screen or scene acquired through the camera module 211.

In various embodiments, if it is determined that transmission of the small raw image is not possible, the electronic device 210 may determine whether there is a change in the current screen or scene acquired through the camera module 211, in operation 1615. The operation of determining whether there is a screen or scene change by the electronic device 210 may include: comparing the currently acquired frame with the previous frame; when the degree of change in the color or brightness of the screen is equal to or larger than a preset condition, determining that there is a change in the screen or scene; and when the degree of change in the color or brightness of the screen is equal to or less than a preset condition, determining that there is no change in the screen or scene.

If it is determined that there is a change in the current screen or scene acquired through the camera module 211, the electronic device 210 may select at least one second correction information from among a plurality of pieces of preset second correction information under the control of one or more processors 213 and 221.

In various embodiments, the electronic device 210 may determine that, among a plurality of pieces of preset recipe information, at least one piece of recipe information corresponding similarly or identically to the current screen or scene acquired through the camera module 211 in terms of the object, brightness, color, and the like, is at least one piece of second information, under the control of one or more processors 213 and 221 in operation 1615.

In various embodiments, the operation of selecting, by the electronic device 210, at least one second correction information from among a plurality of pieces of recipe information under the control of one or more processors 213 and 221 may be as follows.

The one or more processors 213 and 221 may perform a scene analysis of an image based on the current frame acquired through the camera module 211, and may select, as second correction information, one or more of a plurality of pieces of recipe information based on the analyzed scene.

In an operation of analyzing the scene of the image based on the frames acquired by the one or more processors 213 and 221, the one or more processors 213 and 221 may analyze the depth of the image, etc., segment at least one image region by using the analyzed depth, and calculate segmentation information for each region. The one or more processors 213 and 221 may calculate entire scene characteristics and brightness information for each region (e.g., ISO information and illumination information) by using the calculated segmentation information.

The one or more processors 213 and 221 may determine a parameter value for each region of the segmented image by using the calculated brightness information and scene characteristics.

The one or more processors 213 and 221 may select recipe information corresponding to the calculated brightness information, scene characteristics, and a parameter value for each region from among a plurality of pieces of recipe information stored in the memory 219.

The one or more processors 213 and 221 or the ISP 215 may process the image by using recipe information selected in response to the calculated brightness information, scene characteristics, and a parameter value for each region.

If it is determined that there is no change in the current screen or scene acquired through the camera module 221, the electronic device 210 may select recipe information of the previous frame under the control of one or more processors 213 and 221. The recipe information of the previous frame may be first correction information, which is received at a time close to a time when the current screen or scene is acquired through the camera module 211, from among pieces of first correction information received from the cloud platform 250.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An electronic device comprising:
   a camera;
   one or more communication modules;
   one or more memories; and
   one or more processors,
   wherein the one or more processors are configured to:
      acquire a raw image of an external object by using the camera,
      generate a small raw image corresponding to the raw image,
      determine whether transmission of the small raw image from the electronic device to an external device is currently possible, by using at least a part of the one or more communication modules,
      when the transmission of the small raw image is determined to be currently possible, transmit the small raw image to an external electronic device so that the external electronic device generates first correction information by using the small raw image and based on a correction processing scheme of the external device, and receive the first correction information from the external device,
      when the transmission of the small raw image is determined to be currently impossible, determine context information of the raw image and identify second correction information which is generated based on the context information, and
      by using one corresponding correction information, among the first correction information and the second correction information, generate a corrected image which is obtained by correcting the raw image.

2. The electronic device of claim 1, wherein the one or more processors are configured to determine a state of communication connection with the external device based on whether the small raw image is transmittable to the external device or whether the first correction information is receivable from the external device in response to transmission thereof.

3. The electronic device of claim 1, wherein the one or more processors are configured to:
   determine the context information of the raw image according to whether a scene change occurs in the raw image,
   when there is a scene change in the raw image, process the raw image by using the second correction information, and
   when there is no scene change in the raw image, process the raw image by using the second correction information received by the electronic device from the external device in a previous frame.

4. The electronic device of claim 1, wherein the second correction information is preset correction information.

5. The electronic device of claim 1, wherein the one or more processors are configured to generate the second correction information by using the raw image or the small raw image according to an image processing scheme determined based on the context information.

6. The electronic device of claim 1, wherein the one or more processors are configured to:
   predict a state of communication connection with the external device,
   when the state of communication connection has a value equal to or higher than a preset transmission/reception throughput, equal to or less than a preset traffic volume, or equal to or greater than a preset signal strength, transmit the small raw image to the external device at a first cycle, receive the first correction information from the external device, and process the raw image, and
   when the state of communication connection has a value equal to or lower than a preset transmission/reception throughput, equal to or larger than a preset traffic volume, or equal to or smaller than a preset signal strength, transmit the small raw image to the external device at a second cycle, receive the first correction information from the external device, and process the raw image,
   wherein the first cycle is shorter than the second cycle.

7. The electronic device of claim 1, wherein the one or more processors are configured to:
   predict a state of communication connection with the external device,
   when the communication connection state has a value equal to or higher than a preset transmission/reception throughput, equal to or less than a preset traffic volume, or equal to or greater than a preset signal strength, transmit the small raw image to the external device by using an original communication channel without changing a communication channel, receive the first correction information from the external device, and process the raw image, and
   when the communication connection state has a value equal to or lower than a preset transmission/reception throughput, equal to or larger than a preset traffic volume, or equal to or smaller than a preset signal strength, change a communication channel and transmit the small raw image to the external device by using the changed communication channel, receive the first correction information from the external device, and process the raw image.

8. A method for correcting an image based on an image transmission state by an electronic device, the method comprising:
   acquiring a raw image of an external object by using a camera;
   generating a small raw image corresponding to the raw image;
   determining whether transmission of the small raw image from the electronic device to an external device is currently possible, by using at least a part of one or more communication modules;
   when the transmission of the small raw image is determined to be currently possible, transmitting the small raw image to an external electronic device so that the external electronic device generates first correction information by using the small raw image and based on a correction processing scheme of the external device, and receiving the first correction information from the external device;
   when the transmission of the small raw image is determined to be currently impossible, determining context information of the raw image and identifying second correction information which is generated based on the context information; and
   by using one corresponding correction information, among the first correction information and the second correction information, generating a corrected image which is obtained by correcting the raw image.

9. The method of claim 8, wherein the determining of the state of communication connection with the external device further comprises determining the state of communication connection with the external device based on whether the small raw image is transmittable to the external device or whether the first correction information is receivable from the external device in response to transmission thereof.

10. The method of claim 8, further comprising:
determining the context information of the raw image according to whether a scene change occurs in the raw image,
when there is a scene change in the raw image, processing the raw image by using the second correction information, and
when there is no scene change in the raw image, processing the raw image by using the second correction information received from the external device in a previous frame.

11. The method of claim 8, wherein the second correction information is preset correction information.

12. The method of claim 8, further comprising generating the second correction information by using the raw image or the small raw image according to an image processing scheme determined based on the context information.

13. The method of claim 8, further comprising:
predicting a state of communication connection with the external device;
when the communication connection state has a value equal to or higher than a preset transmission/reception throughput, equal to or less than a preset traffic volume, or equal to or greater than a preset signal strength, transmitting the small raw image to the external device at a first cycle, receiving the first correction information from the external device, and processing the raw image; and
when the communication connection state has a value equal to or lower than a preset transmission/reception throughput, equal to or larger than a preset traffic volume, or equal to or smaller than a preset signal strength, transmitting the small raw image to the external device at a second cycle, receiving the first correction information from the external device, and processing the raw image,
wherein the first cycle is shorter than the second cycle.

14. The method of claim 8, further comprising:
predicting a state of communication connection with the external device;
when the communication connection state has a value equal to or higher than a preset transmission/reception throughput, equal to or less than a preset traffic volume, or equal to or greater than a preset signal strength, transmitting the small raw image to the external device by using an original communication channel without changing a communication channel, receiving the first correction information from the external device, and processing the raw image; and
when the communication connection state has a value equal to or lower than a preset transmission/reception throughput, equal to or larger than a preset traffic volume, or equal to or smaller than a preset signal strength, changing a communication channel and transmitting the small raw image to the external device by using the changed communication channel, receiving the first correction information from the external device, and processing the raw image.

15. The method of claim 8, further comprising:
performing control to display a camera app icon including a first image on a home screen of a display;
determining whether or not a photographing operation based on the external device is activated; and
performing control to display the camera app icon including a second image on the home screen of the display when the photographing operation based on the external device is activated.

* * * * *